United States Patent
Larsson

(10) Patent No.: US 7,635,825 B2
(45) Date of Patent: Dec. 22, 2009

(54) ARRANGEMENT AND METHOD FOR PRODUCING A THREE-DIMENSIONAL PRODUCT

(75) Inventor: Morgan Larsson, Göteborg (SE)

(73) Assignee: Arcam AB, Molndal (SE)

( * ) Notice: Subject to any disclaimer, the term of this patent is extended or adjusted under 35 U.S.C. 154(b) by 436 days.

(21) Appl. No.: 10/539,587

(22) PCT Filed: Dec. 12, 2003

(86) PCT No.: PCT/SE03/01937

§ 371 (c)(1),
(2), (4) Date: Feb. 7, 2006

(87) PCT Pub. No.: WO2004/056509

PCT Pub. Date: Jul. 8, 2004

(65) Prior Publication Data

US 2006/0157454 A1    Jul. 20, 2006

(30) Foreign Application Priority Data

Dec. 19, 2002    (SE)    .................................... 0203765

(51) Int. Cl.
*B23K 26/08*    (2006.01)
*H05B 6/00*    (2006.01)
(52) U.S. Cl. .................................... 219/121.8; 264/497
(58) Field of Classification Search . 219/121.6–121.85; 264/497
See application file for complete search history.

(56) References Cited

U.S. PATENT DOCUMENTS

| 4,863,538 | A | 9/1989 | Deckard |
| 5,132,143 | A | 7/1992 | Deckard |
| 5,155,324 | A | * | 10/1992 | Deckard et al. ............. 264/497 |
| 5,352,405 | A | 10/1994 | Beaman et al. |
| 5,932,059 | A | 8/1999 | Langer et al. |

FOREIGN PATENT DOCUMENTS

| CN | 1729068 A | 2/2006 |
| EP | 1 157 807 A1 | 11/2001 |
| SE | 0001557 | 10/2001 |
| WO | WO-01/81031 A1 | 11/2001 |
| WO | WO-2004/054743 A1 | 7/2004 |
| WO | WO-2004/056510 A1 | 7/2004 |
| WO | WO-2004/056511 A1 | 7/2004 |
| WO | WO-2004056512 A1 | 7/2004 |

* cited by examiner

*Primary Examiner*—Sang Y Paik
(74) *Attorney, Agent, or Firm*—Birch, Stewart, Kolasch & Birch, LLP

(57) ABSTRACT

An arrangement and method for production of three-dimensional bodies by successive fusing together of selected areas of a powder bed, which parts correspond to successive cross sections of the three-dimensional body, which method comprises the following method steps: application of powder layers to a work table, supplying energy from a radiation gun according to an operating scheme determined for the powder layer to said selected area within the powder layer, fusing together that area of the powder layer selected according to said operating scheme for forming a cross section of said three-dimensional body, a three-dimensional body being formed by successive fusing together of successively formed cross sections from successively applied powder layers.

23 Claims, 13 Drawing Sheets a-a b-b c-c

ARRANGEMENT AND METHOD FOR PRODUCING A THREE-DIMENSIONAL PRODUCT

TECHNICAL FIELD

The invention relates to an arrangement and a method for production of a three-dimensional product by successive fusing together of selected parts of powder layers applied to a work table.

BACKGROUND ART

An arrangement for producing a three-dimensional product by successive fusing together of selected parts of powder layers applied to a work table is previously known from, for example, U.S. Pat. No. 4,863,538. The arrangement comprises a work table on which said three-dimensional product is to be built up, a powder dispenser which is arranged so as to distribute a thin layer of powder on the work table for forming a powder bed, a radiation gun for delivering energy to the powder, fusing together of the powder then taking place, means for guiding the beam emitted by the radiation gun over said powder bed for forming a cross section of said three-dimensional product by fusing together parts of said powder bed, and a control computer in which information about successive cross sections of the three-dimensional product is stored. The three-dimensional product is built up by fusing together selected parts of successive powder layers applied. The control computer is intended to control deflection means for the beam generated by the radiation gun over the powder bed according to an operating scheme which reproduces a predetermined pattern. When the operating scheme has fused together a desired area of a powder layer, a cross section of said three-dimensional product has been formed. A three-dimensional product is formed by successive fusing together of successively formed cross sections from powder layers applied successively by the powder dispenser.

An arrangement for producing a three-dimensional product where measurement of the surface structure and the surface temperature of the three-dimensional body produced is permitted during the manufacturing procedure is known from SE 0001557-8. By using the arrangement described therein, increased correspondence of the shape of the three-dimensional bodies produced in relation to the intended shape is made possible. In the process for manufacturing the three-dimensional products, however, it has been found that surface stresses in the manufactured product give rise to shape deviations and also internal stresses in the product which can give rise to the initiation of crack formation.

BRIEF DESCRIPTION OF THE INVENTION

One object of the invention is to provide a method for production of three-dimensional bodies where reduction of the occurrence of surface stresses and shape deviations induced by these and also the occurrence of internal stresses in the end product is made possible. This object is achieved by an arrangement according to the characterizing part of patent claim 1. By virtue of, in a method for production of three-dimensional bodies, dividing the selected area of a powder bed corresponding to a cross section of the three-dimensional body into a plurality of smaller part areas which consist of an inner area and an edge, it is made possible to provide operating schemes where the energy supply can take place in an advantageous way in order to ensure that the working temperature at the top layer of the body to be manufactured can be kept within an acceptable temperature range. The possibility of keeping the working surface within a narrow temperature range means that surface stresses in the manufactured product can be reduced. Surface stresses give rise to shape deviations and also internal stresses in the product which can give rise to the initiation of crack formation.

An inner area is preferably treated in a process step which is separate from the treatment of the edge which surrounds the inner area. Separate process step means that the edge is finished either before or after the inner area.

According to a first preferred embodiment of the invention, by virtue of fusing together the inner area of a set of adjacent part areas in a first process step, and then fusing together the edges which connect said part areas in a second, subsequent process step, a three-dimensional body is obtained after manufacture which has a lower degree of internal stresses than if the selected area were fused together using a linear sweep pattern along the entire surface of the selected area. This is due to the fact that two adjacent areas, which have been formed into a solid body, are freely movable until these two adjacent areas are joined together by fusing together the material which forms the common boundary line. The joining together thus takes place in a stress-free state.

According to a second embodiment, the priority for treating the smaller part areas which constitute a selected cross section is determined with the aid of a random number generator. This process ensures that the heating of the entire surface to be treated takes place in a relatively homogeneous way in contrast to if systematic planning of fusing together of adjacent areas in close succession consecutively one after another takes place. This method is especially advantageous if the selected area is divided into a very great number of smaller part areas, preferably more than 100 or 1000. The random process can also include intelligent selection where areas which are adjacent to an area which has just been heated are given less probability of being picked as the next area. A heat camera used in the method can be arranged so as to measure the temperature of all the areas included and then adjust probabilities depending on the temperature of each smaller area. If N areas are used and the bed temperature varies from $T_0$, which corresponds to the uninfluenced bed temperature, to $T_S$, which corresponds to the temperature of an area which has just been fused, the probability of an area being selected is preferably adjusted to $P(i)=T_S-Ti/\Sigma(T_s-Tn)$. An area which has just been fused will then be given the probability 0 of being heated again. The probability for all cold areas is equal, and the probability of an area being selected to be the next area for treatment is linearly dependent on the temperature in relation to the fusion temperature.

According to a third embodiment, which can advantageously be used if a lower degree of homogeneity is required for parts of the interior of the body, the edges can instead be fused together in a first process step for a number of consecutive powder layers, after which the inner areas of said consecutive powder layers are fused together in a common second process step for said consecutive powder layers. By means of this procedure, a body is obtained with a smooth outer surface and internal partitions corresponding to the inner edges where the internal partitions have a high degree of solidity. The intermediate inner areas have a lower degree of fusing together, it being possible for a certain porosity to be obtained. As the product in this case is advantageously not entirely homogeneous, the risk of the appearance of internal stresses is reduced as a certain capacity for movement in the inner porous structure allows internal stresses to be attenuated.

According to a fourth embodiment of the invention, the inner area is fused together in the course of a movement pattern for the focal point of the beam of the radiation gun which comprises a main movement direction and an interference term which is added to said main movement direction and has a component in a direction at right angles to the main movement direction. The interference term has a time mean value corresponding to zero drift from the main movement direction. The main movement direction has a propagation speed which preferably corresponds to the propagation speed of a fusion zone of a treated material. The main movement direction can have any curve shape, for example rectilinear, curved, circular. The appearance of the main movement direction is adapted to the shape of the object to be created. However, the interference term is not adapted to the shape of the object but is designed in order to provide a more favorable local heat distribution in an area around the focal point. The movement pattern of the beam thus ensures that the energy of the radiation gun is supplied to the powder layer with more uniform intensity, the risk of overheating being reduced. This in turn reduces the risk of the appearance of shape deviations and stresses in the end product. According to a preferred embodiment, the edge is fused together in the course of a mainly rectilinear movement, which follows the shape of the edge, of the beam of the radiation gun. By virtue of the edge being fused together in the course of a movement which follows the shape of the edge, it is ensured that the lateral surface of the finished body is smooth.

According to another preferred embodiment of the invention, an energy balance is calculated for each powder layer, it being determined in the calculation whether energy fed into the powder layer when said supply of energy from a radiation gun according to an operating scheme determined for the powder layer for fusing together that area of the powder layer selected according to said operating scheme takes place is sufficient to maintain a defined working temperature of the next layer, information being obtained which makes it possible to maintain a defined temperature. By maintaining a defined working temperature, that is to say a surface temperature within a given defined temperature range, during the production of all the layers, it is ensured that the occurrence of surface stresses which arise when cooling of the three-dimensional body is too great is reduced. This in turn leads to the end product having a reduced occurrence of shape deviations and also a reduced occurrence of internal stresses in the end product.

Another object of the invention-is to provide an arrangement for production of three-dimensional bodies where reduction of the occurrence of surface stresses and shape deviations induced by these and also the occurrence of internal stresses in the end product is made possible. This object is achieved by an arrangement according to the characterizing part of patent claim 11.

According to a first preferred embodiment of the invention, the radiation gun is arranged so as to fuse together the inner area of a set of adjacent part areas in a first process step, and then to fuse together the edges which connect said part areas in a second, subsequent process step, a three-dimensional body being obtained after manufacture which has a lower degree of internal stresses than if the selected area were fused together using a linear sweep pattern along the entire surface of the selected area. This is due to the fact that two adjacent areas, which have been formed into a solid body, are freely movable until these two adjacent areas are joined together by fusing together the material which forms the common boundary line. The joining together thus takes place in a stress-free state.

According to a second embodiment, a random number generator is arranged so as to determine the priority for treating the smaller part areas which constitute a selected cross section. This process ensures that the heating of the entire surface to be treated takes place in a relatively homogeneous way in contrast to if systematic planning of fusing together of adjacent areas in close succession consecutively one after another takes place. This method is especially advantageous if the selected area is divided into a very great number of smaller part areas, preferably more than 100 or 1000. The random process can also include intelligent selection where areas which are adjacent to an area which has just been heated are given less probability of being picked as the next area. A heat camera used in the method can be arranged so as to measure the temperature of all the areas included and then adjust probabilities depending on the temperature of each smaller area. If N areas are used and the bed temperature varies from To, which corresponds to the uninfluenced bed temperature, to $T_S$, which corresponds to the temperature of an area which has just been fused, the probability of an area being selected is preferably adjusted to $P(i)=T_S-Ti/\Sigma(T_S-Tn)$. An area which has just been fused will then be given the probability 0 of being heated again. The probability for all cold areas is equal, and the probability of an area being selected to be the next area for treatment is linearly dependent on the temperature in relation to the fusion temperature.

According to a third embodiment, which can advantageously be used if a lower degree of homogeneity is required for parts of the interior of the body, the radiation gun is arranged so as to fuse together the edges in a first process step for a number of consecutive powder layers, after which the inner areas of said consecutive powder layers are fused together in a common second process step for said consecutive powder layers. By means of this procedure, a body is obtained with a smooth outer surface and internal partitions corresponding to the inner edges where the internal partitions have a high degree of solidity. The intermediate inner areas have a lower degree of fusing together, it being possible for a certain porosity to be obtained. As the product in this case is advantageously not entirely homogeneous, the risk of the appearance of internal stresses is reduced as a certain capacity for movement in the inner porous structure allows internal stresses to be attenuated.

According to a fourth embodiment of the invention, the operating scheme is arranged so as to provide a movement pattern for the focal point of the beam of the radiation gun which comprises a main movement direction and an interference term which is added to said main movement direction and has a component in a direction at right angles to the main movement direction. The interference term has a time mean value corresponding to zero drift from the main movement direction. The main movement direction has a propagation speed which preferably corresponds to the propagation speed of a fusion zone of a treated material. The main movement direction can have any curve shape, for example rectilinear, curved, circular. The appearance of the main movement direction is adapted to the shape of the object to be created. However, the interference term is not adapted to the shape of the object but is designed in order to provide a more favorable local heat distribution in an area around the focal point. The movement pattern of the beam thus ensures that the energy of the radiation gun is supplied to the powder layer with more uniform intensity, the risk of overheating being reduced. This in turn reduces the risk of the appearance of shape deviations and stresses in the end product. According to a preferred embodiment, the edge is fused together in the course of a mainly rectilinear movement, which follows the shape of the edge, of the beam of the radiation gun. By virtue of the edge being fused together in the course of a movement which follows the shape of the edge, it is ensured that the lateral surface of the finished body is smooth.

In a preferred embodiment of the invention, the control computer included in the arrangement is arranged so as to calculate an energy balance for each powder layer, it being determined in the calculation whether energy fed into the powder layer when said supply of energy from a radiation gun according to an operating scheme determined for the powder layer for fusing together that area of the powder layer selected according to said operating scheme takes place is sufficient to maintain a defined working temperature of the next layer, information being obtained which makes it possible to maintain a defined working temperature. By maintaining a defined working temperature, that is to say a surface temperature within a given defined temperature range, during the production of all the layers, it is ensured that the occurrence of surface stresses which arise when cooling of the three-dimensional body is too great is reduced. This in turn leads to the end product having a reduced occurrence of shape deviations and also a reduced occurrence of internal stresses in the end product.

DESCRIPTION OF FIGURES

The invention will be described in greater detail below in connection with accompanying drawing figures, in which.

MODE(S) FOR CARRYING OUT THE INVENTION

Figure 1:
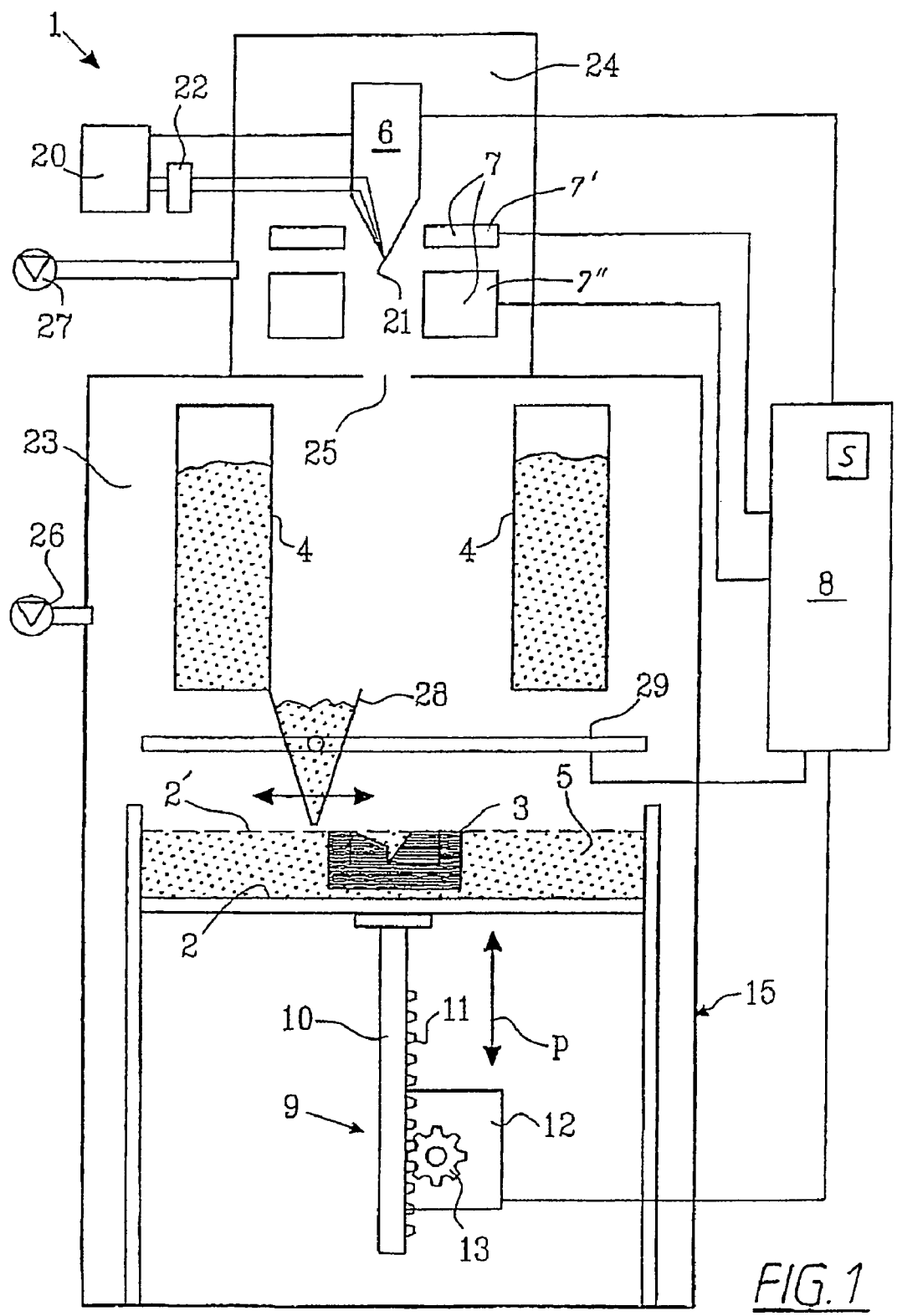
FIG. 1 shows a cross section of an arrangement according to the invention.

FIG. 1 shows an arrangement for producing a three-dimensional product generally designated by 1. The arrangement comprises a work table 2 on which a three-dimensional product 3 is to be built up, one or more powder dispensers 4 and also means 28 which are arranged so as to distribute a thin a layer of powder on the work table 2 for forming a powder bed 5, a radiation gun 6 for delivering energy to the powder bed, fusing together of parts of the powder bed then taking place, means 7 for guiding the beam emitted by the radiation gun 6 over said work table for forming a cross section of said three-dimensional product by fusing together said powder, and a control computer 8 in which information about successive cross sections of the three-dimensional product is stored, which cross sections build up the three-dimensional product. In a work cycle, the work table will, according to the preferred embodiment shown, be lowered gradually in relation to the radiation gun after each powder layer applied. In order to make this movement possible, the work table is, in a preferred embodiment of the invention, arranged movably in the vertical direction, that is to say in the direction indicated by the arrow P. This means that the work table starts in a starting position 2' in which a first powder layer of the necessary thickness has been applied. So as not to damage the underlying work table and in order to provide this layer with sufficient quality, this layer is thicker than other layers applied, fusing through of this first layer then being avoided. The work table is subsequently lowered in connection with a new powder layer being distributed for forming a new cross section of the three-dimensional product. In one embodiment of the invention, the work table is to this end supported by a stand 9 which comprises at least one ball screw 10, provided with toothing 11. A step motor or servomotor 12 provided with a gearwheel 13 sets the work table 2 to the desired vertical position. Other arrangements known to the expert for setting the working height of a work table can also be used. Adjusting screws, for example, can be used instead of racks. According to an alternative embodiment of the invention, means for powder distribution included in the arrangement can be raised gradually instead of lowering the work table as in the embodiment described above.

The means 28 is arranged so as to interact with said powder dispensers for replenishment of material. Furthermore, the sweep of the means 28 over the working surface is driven in a known manner by a servomotor (not shown) which, moves the means 28 along a guide rail 29 which runs along the powder bed.

When a new powder layer is applied, the thickness of the powder layer will be determined by how much the work table has been lowered in relation to the previous layer. This means that the layer thickness can be varied according to requirements. It is therefore possible, when a cross section has a great change in shape between adjacent layers, to make thinner layers, a higher surface fineness then being achieved, and, when there is little or no change in shape, to make layers with maximum penetration thickness for the beam.

In a preferred embodiment of the invention, the radiation gun 6 consists of an electron gun, the means 7 for guiding the beam of the radiation gun consisting of deflecting coils 7". The deflecting coil generates a magnetic field which guides the beam produced by the electron gun, it then being possible for fusion of the surface layer of the powder bed in the desired location to be brought about. The radiation gun also comprises a high-voltage circuit 20 which is intended to provide the radiation gun in a known manner with an acceleration voltage for an emitter electrode 21 arranged in the radiation gun. The emitter electrode is in a known manner connected to a current source 22 which is used to heat the emitter electrode 21, electrons then being released. The functioning and composition of the radiation gun are well-known to an expert in the field.

The deflecting coil is controlled by the control computer 8 according to an operating scheme laid out for each layer to be fused together, it then being possible to guide the beam according to a desired operating scheme. Details of the appearance according to the invention of the operating scheme are described below in connection with the description of FIGS. 2-9.

Also present is at least one focusing coil 7' which is arranged so as to focus the beam on the surface of the powder bed on the work table. Deflecting coils 7" and focusing coils 7' can be arranged according to a number of alternatives well known to the expert.

The arrangement is enclosed in a casing 15 which encloses the radiation gun 6 and the powder bed 2. The casing 15 comprises a first chamber 23 which surrounds the powder bed and a second chamber 24 which surrounds the radiation gun 6. The first chamber 23 and the second chamber 24 communicate with one another via a passage 25 which allows emitted electrons, which have been accelerated in the high-voltage field in the second chamber, to continue into the first chamber, subsequently to strike the powder bed on the work table 2.

In a preferred embodiment, the first chamber is connected to a vacuum pump 26 which lowers the pressure in the first chamber 23 to a pressure of preferably roughly $10^{-3}$-$10^{-5}$ mbar. The second chamber 24 is preferably connected to a vacuum pump 27 which lowers the pressure in the second chamber 24 to a pressure of roughly $10^{-4}$-$10^{-6}$ mbar. In an alternative embodiment, both the first and second chambers can be connected to the same vacuum pump.

The control computer 8 is furthermore preferably connected to the radiation gun 6 for regulating the output of the radiation gun and also connected to the step motor 12 for adjusting the vertical position of the work table 2 between consecutive applications of powder layers, it then being possible to vary the individual thickness of the powder layers.

The control computer is also connected to said means 28 for powder distribution on the working surface. This means is arranged so as to sweep over the working surface, a layer of powder being distributed. The means 28 is driven by a servomotor (not shown) which is controlled by said control computer 8. The control computer controls the sweep along and ensures that powder is replenished as required. For this reason, load sensors can be arranged in the means 28, the control computer then being able to obtain information about the means being empty or having become stuck.

According to a preferred embodiment of the invention, the control computer 8 is also arranged so as to calculate an energy balance for the selected area to be treated within each powder layer, it being determined in the calculation whether energy radiated into the selected area from the surroundings of the selected area is sufficient to maintain a defined working temperature of the selected area.

Figure 2:
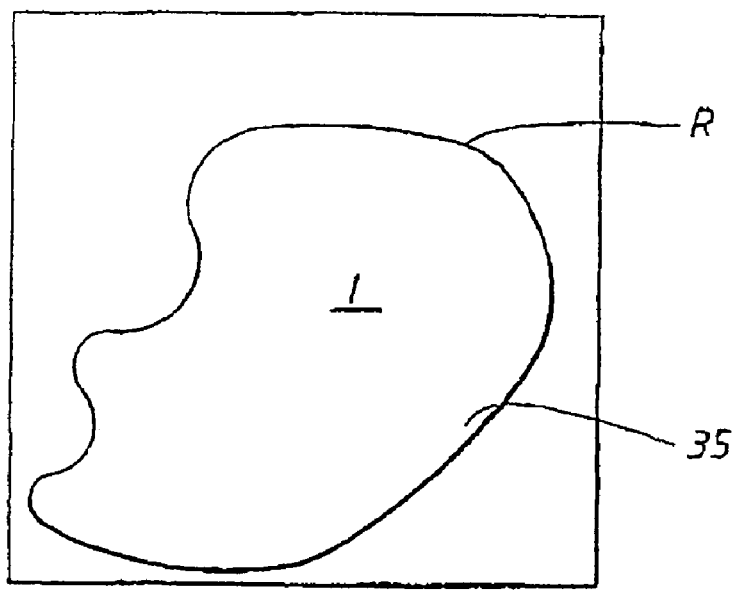
FIG. 2 shows an area to be fused together, which has an inner area and an edge.

FIG. 2 shows diagrammatically an area 35 to be fused together. The area comprises an inner area I delimited by an edge R. According to the invention, the operating scheme is designed in such a way that the area to be fused together, that is to say the selected area, is divided into one or more inner areas 1, each having an edge R. An inner area is preferably treated in a process step which is separate from the treatment of the edge which surrounds the inner area. Separate process step means that the edge is finished either before or after the inner area.

Figure 3:
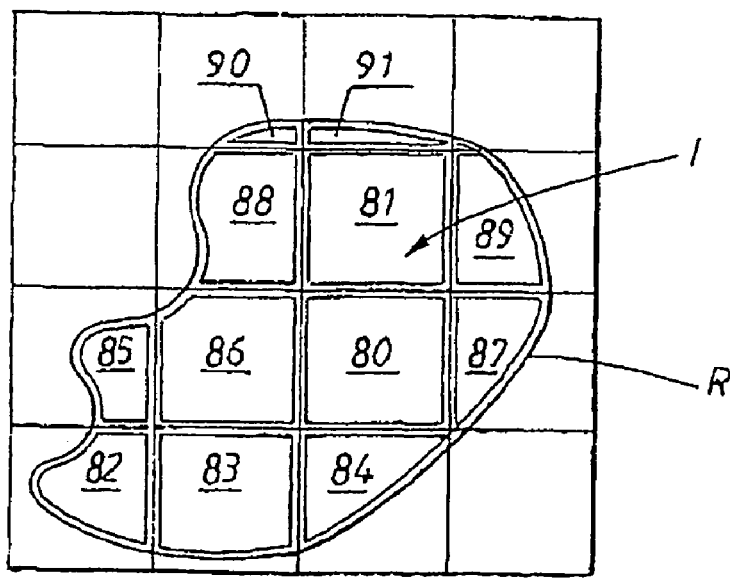
FIG. 3 shows a further division of the area to be fused together into a set of separate areas having respective inner areas and edges.

FIG. 3 shows diagrammatically an area 35 to be fused together. This area is divided into a number of part areas 80-91 which each have an inner area and an edge. According to a first preferred embodiment of the invention, the inner area I of a set of adjacent part areas is fused together in a first process step, after which said edges R are fused together and connect said part areas in a second, subsequent process step. By means of this procedure, the occurrence of bending stresses in the three-dimensional body after cooling is reduced.

Figure 4:
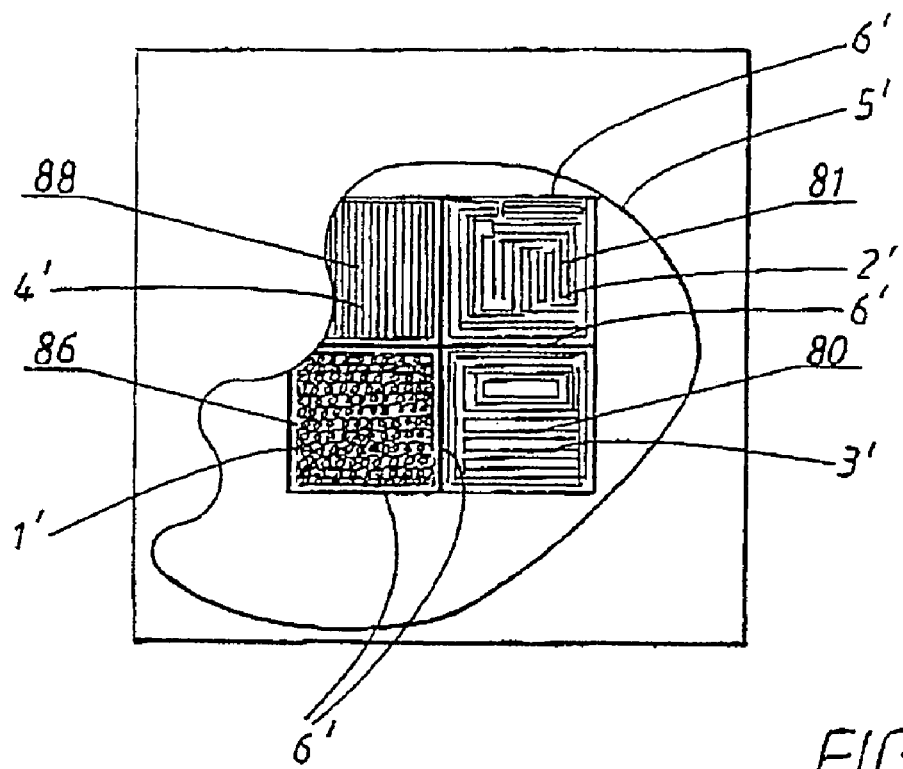
FIG. 4 shows diagrammatically an example of how a number of adjacent inner areas are treated in a first process step, after which edges belonging to said adjacent part areas are fused together in a second, subsequent process step.

FIG. 4 shows diagrammatically an example of how a number of adjacent inner areas are treated in a first process step comprising fusing together of the inner area 86, which has been carried out using a first operating scheme 1'. The operating scheme 1' shown comprises a partly overlapping helical movement in accordance with the description below. The inner area 81 is then fused together according to a second operating scheme 2'. The inner area 80 is also fused together according to a third operating scheme 3'. Finally, the inner area 88 is fused together according to a fourth operating scheme 4'. In this way, a set of adjacent part areas has been fused together in a first process step. Subsequently, the edges which surround the adjacent part areas 80, 81, 86, 88 are fused together. This is effected according to a fifth operating scheme 5' which comprises fusing together the outer edge and a sixth operating scheme 6' comprising the inner edges which delimit the part areas from one another.

Figure 5:
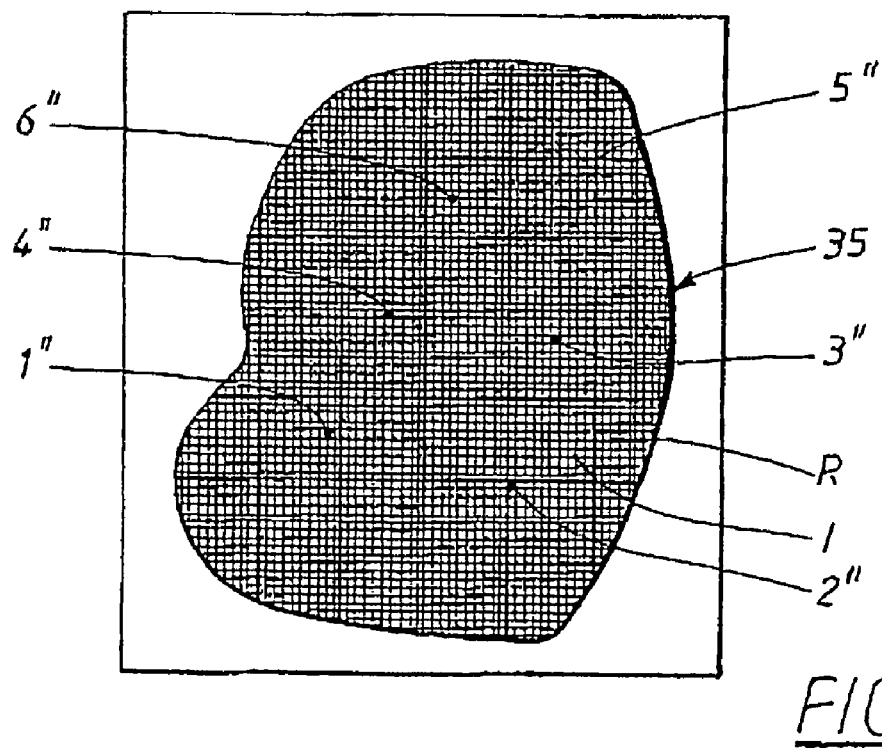
FIG. 5 shows a selected area which is divided into a very great number of inner areas in a squared pattern.

According to a second preferred embodiment, the operating scheme is arranged so as to determine the priority for treating said plurality of smaller part areas with the aid of a random number generator. To this end, the control computer 8 comprises a random number generator S. This method is especially advantageous if the selected area is divided into a very great number of smaller part areas, preferably more than 100 or 1000. An example of such division is shown in FIG. 5 where a selected area 35 is divided into a very great number of inner areas in a squared pattern. A random priority shows how a series of areas 1"-6" is treated consecutively.

According to a preferred embodiment, the random process can also include intelligent selection where areas which are adjacent to an area which has just been heated are given less probability of being picked as the next area. A heat camera used in the method can be arranged so as to measure the temperature of all the areas included and then adjust probabilities depending on the temperature of each smaller area. If N areas are used and the bed temperature varies from $T_0$, which corresponds to the uninfluenced bed temperature, to $T_S$, which corresponds to the temperature of an area which has just been fused, the probability of an area being selected is preferably adjusted to $P(i)=T_S-Ti/\Sigma(T_S-Tn)$. An area which has just been fused will then be given the probability 0 of being heated again. The probability for all cold areas is equal, and the probability of an area being selected to be the next area for treatment is linearly dependent on the temperature in relation to the fusion temperature. Instead of using a heat camera, the probability can be logically controlled and, for selection of a point, increase with the distance from a point which has just been selected. The probability calculation is preferably prepared on the basis of information from the thermal conductivity equation. When a very great number of part areas is fused together, the calculation for adjusting probabilities becomes complicated. For this reason, it is advantageous to make use of the heat camera described above.

In an alternative embodiment, the edges can be fused together in a first process step and the inner areas in a subsequent process step. This can be advantageous when very thin powder layers are distributed, a solid lateral surface being created, if appropriate with a number of inner supporting partitions. The inner areas can then be fused together in a subsequent process step where several powder layers are fused together in a common sweep of the radiation gun over several layers. This results in the inner areas being lightly sintered, which can be advantageous for certain products. According to this third embodiment of the invention, edges are fused together in a first process step for a number of consecutive powder layers, after which the inner areas of said consecutive powder layers are fused together in a common, second process step for said consecutive powder layers. This is shown diagrammatically in FIGS. 6 and 7.

Figure 6:
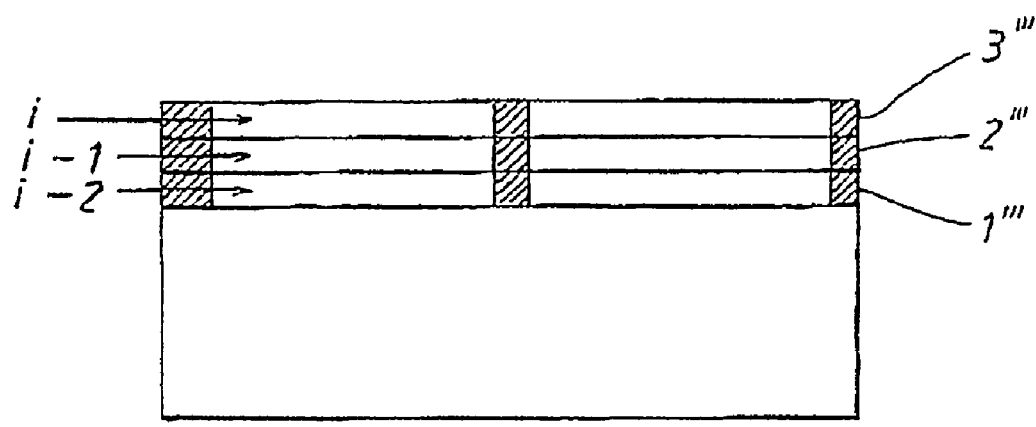
FIG. 6 shows a number of consecutive powder layers where the edges are fused together with intermediate new powder application, after which the inner areas of several powder layers are treated in a common subsequent process step.
Figure 7:
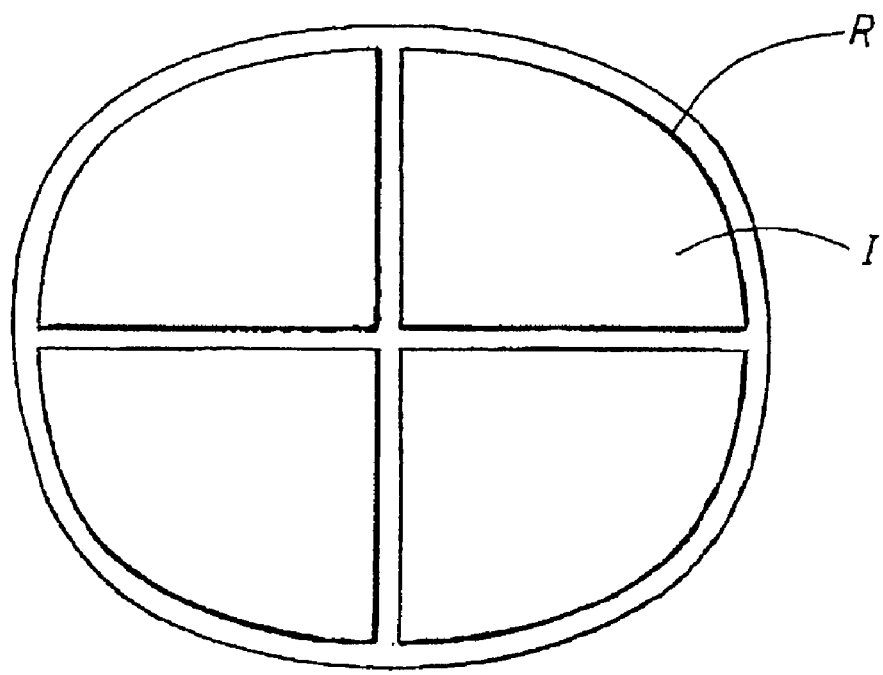
FIG. 7 shows FIG. 6 seen from above.

FIG. 6 shows a number of consecutive layers i, i-1, i-2 where the edges 1''', 2''', 3''' have been fused together with intermediate new powder application. After this, the inner areas I (FIG. 7) have been fused together in a process step common to several layers i, i-1, i-2. As a thicker layer is applied, this method is suitable especially for forming a body with a smooth outer surface and internal partitions corresponding to the inner edges where the internal partitions have a high degree of solidity. The intermediate inner areas have a lower degree of fusing together, it being possible for a certain porosity to be obtained. As the product in this case is advantageously not entirely homogeneous, the risk of the appearance of internal stresses is reduced as a certain capacity for movement in the inner porous structure allows internal stresses to be attenuated.

Figure 8:
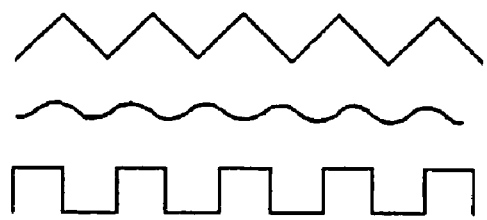
FIG. 8 shows a set of different curve shapes with a one-dimensional interference term.

According to a preferred embodiment of the invention, the inner area I is fused together using a movement pattern for the focal point of the beam of the radiation gun which comprises a main movement direction and an interference term which is added to said main movement direction and has a component in a direction at right angles to the main movement direction. The interference term changes direction and has a time mean value corresponding to zero drift from the main movement direction. FIG. 8 shows three different examples of different appearances of the interference term which give rise to a movement in the form of a triangular wave, a sinusoidal curve and a square wave. At least that edge which forms an inner or outer lateral surface of the finished body is preferably fused together in the course of a movement which follows the edge without addition of an interference term.

Figure 9:
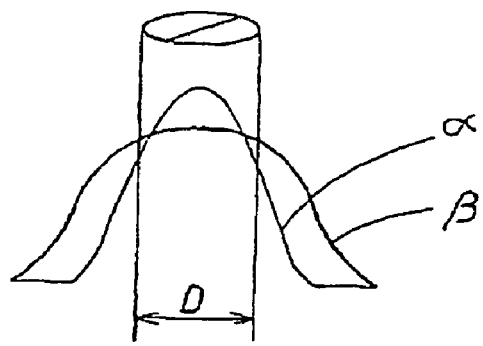
FIG. 9 shows diagrammatically how the heat distribution appears in a body where the focal point with the diameter D of a radiation gun has heated the body, on the one hand in the presence of an interference term on the other hand in the absence of an interference term.

FIG. 9 shows diagrammatically how the heat distribution appears in a body where the focal point with the diameter D of a radiation gun has heated the body. The temperature distribution around the focal point has the shape of a Gaussian bell. The temperature distribution around a focal point without interference term is shown by the curve marked ($\alpha$). By means of the interference term, the trace treated in the course of propagation of the beam along the main movement direction is widened. A widened trace is shown by the curve indicated by ($\beta$). The widened trace also has a temperature distribution with a lower maximum value. This reduces the risk of the appearance of overheating with the formation of irregularities as a consequence.

Figure 10:
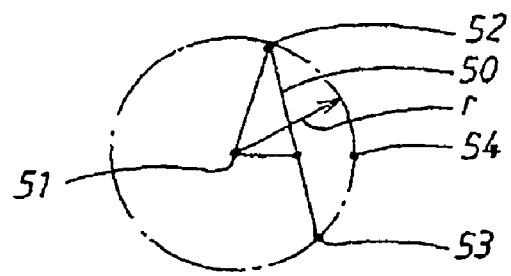
FIG. 10 shows an example of the movement of the focal point in relation to movement of the focal point along the main movement direction.

The interference term is preferably of such a nature that a fusion zone is formed which has a width essentially corresponding to twice the amplitude of the component of the interference term in a direction at right angles to the main movement direction. The average speed of the absolute value of the movement of the focal point in the direction of the interference term is preferably to exceed the speed of the heat propagation in the material. The speed in the main movement direction preferably corresponds to the speed of the heat propagation in the material. The amplitude and the frequency of the interference term are preferably to be adapted in such a way that the focal point is able to move from its starting position where the interference term has the value zero, pass through the minimum and the maximum value of the interference term and return to its position in the time it takes the wave front of the heat propagation to move from the first zero position to the second zero position. This is shown diagrammatically in FIG. 10. FIG. 10 shows how the focal point moves along the curve 50 from a first position 51, past a maximum 52 of the interference term, a minimum 53 of the interference term and then takes up a second position 54 with a zero value of the interference term. During this time, the wave front of the heat propagation has been propagated from the first position 51 to the second position. If the average speed of the interference term is too low, a curved fused trace which runs within the path defined by the end points of the interference term is formed instead of a wide trace.

Figure 11:
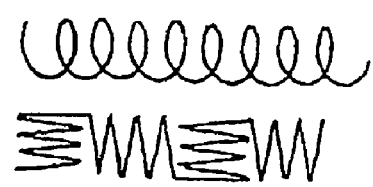
FIG. 11 shows a set of different curve shapes with a two-dimensional interference term.

According to a preferred embodiment, the interference term also has a component in a direction parallel to the main movement direction. The interference term is in this case two-dimensional. Examples of interference terms with a two-dimensional direction are given in FIG. 11.

The edge R is preferably fused together in the course of a mainly rectilinear movement of the beam of the radiation gun.

The purpose of operating with a movement pattern for the focal point of the beam of the radiation gun which comprises a main movement direction and an interference term added to said main movement direction which has a component in a direction at right angles to the main movement direction is that, with a wider trace, it is possible to move the fusion zone more slowly but still fuse at a relatively high speed compared with conventional operation.

Slow movement of the fusion zone produces less vaporization and a reduced incidence of fused material boiling and splashing. The purpose of the edge being fused together using a continuous mainly rectilinear movement is that this produces a smooth surface structure for the finished product.

An analysis of the movement pattern for the beam of the radiation gun in the case of a preferred embodiment of the invention with a two-dimensional interference term, which gives rise to a helix-like movement pattern of the focal point, follows below.

The position of a focal point which rotates about the x axis and moves along the same axis at the speed $V_x$ can be obtained from:

$$\overline{r}(t) = (V_x t + A_x \cos(\omega t))\overline{x} + A_y \sin(\omega t)\overline{y} \quad \text{Equ. 1}$$

where $A_x$ and $A_y$ are the amplitudes in the x and y direction respectively. A typical "spinning curve" can appear like that shown in FIG. 12.

Figure 12:
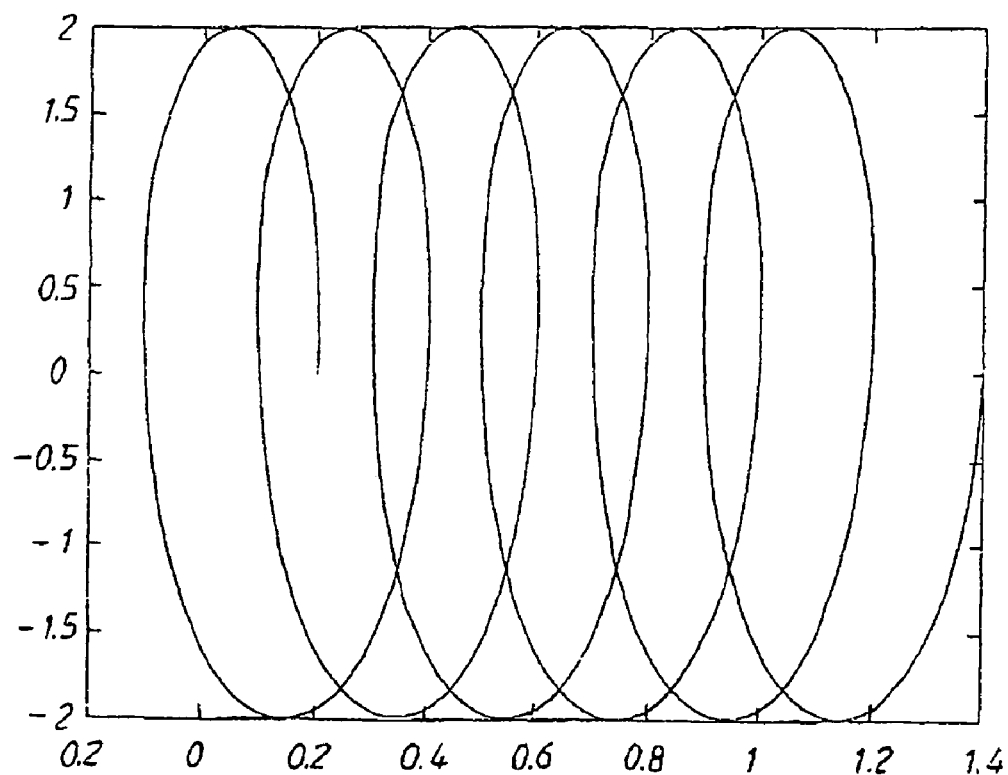
FIG. 12 shows the movement pattern of a focal point according to a preferred embodiment of the invention.

The pattern shown in FIG. 12 is obtained if $\omega$ is set to:

$$\omega = \frac{2\pi V_x}{A_x} \quad \text{Equ. 2}$$

The speed of the focal point is given by:

$$\frac{d\overline{r}(t)}{dt} = (V_x - A_x \omega \sin(\omega t))\overline{x} + A_y \omega \cos(\omega t)\overline{y} \quad \text{Equ. 3}$$

Its absolute speed is therefore:

$$\left|\frac{d\overline{r}(t)}{dt}\right| = \sqrt{(V_x - A_x \omega \sin(\omega t))^2 + (A_y \omega \cos(\omega t))^2} \quad \text{Equ. 4}$$

If the focal point moves according to the formulas above, its speed will vary and either be at a maximum underneath the x axis and a minimum above or vice versa depending on the direction of rotation. In order to obtain a focal point which moves at constant speed along the spinning curve in FIG. 12, its average speed is first calculated:

$$V_{average} = \frac{\int_0^T \left|\frac{d\overline{r}(t)}{dt}\right| dt}{T} \quad \text{Equ. 5}$$

Where:

$$T = \frac{2\pi}{\omega}$$

$V_{average}$ is the speed at which the focal point is to move. At the time t, the focal point has moved the distance:

$$s = t * V_{average}$$

This distance must be equal to the spinning curve length at the time t'. Therefore:

$$s = t * V_{average} = \int_0^{t'} \left|\frac{d\overline{r}(t)}{dt}\right| dt \quad \text{Equ. 6}$$

Solving Equ. 6 for 0<t<T gives t' as a function of t. t' is then used in Equ. 1 which gives the position of the spot as a function of the time t.

A number of simulations using different speeds and Ay has shown that the fusion zone 0.1-0.15 mm below the surface has an approximate width of 1.8Ay. The hop between two spin lines should then be:

Hop spin=1.8Ay−0.3

The distance to the start from an edge is approximately:

Starting hop=0.8Ay−0.15

Figure 13:
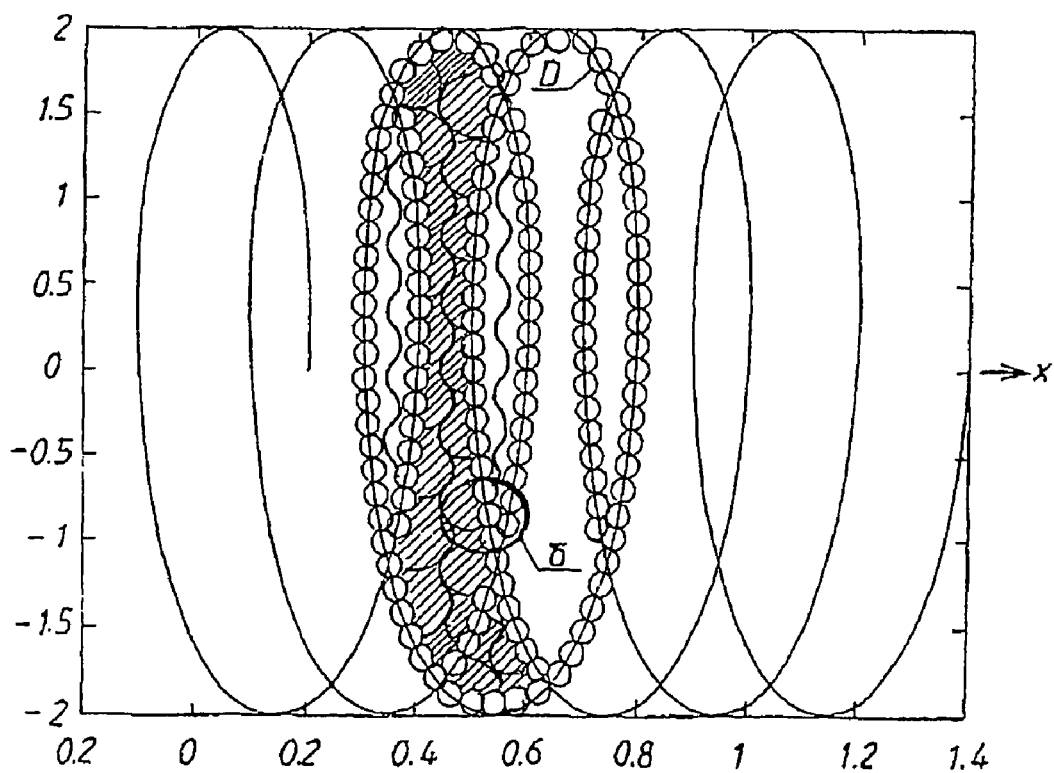
FIG. 13 shows the positioning of the focal points and also a widened area within which fusing together takes place.

FIG. 13 shows a continuous wide fused edge which propagates in the direction x marked by an arrow in the diagram. The focal points with a diameter D are marked in the diagram. The overlapping pattern ensures that fusing together takes place within an area outside the focal point. Such an area is illustrated and marked by the symbol δ. Together, these areas form an overall area which propagates in the direction marked by the arrow x.

According to a preferred embodiment of the invention, the control computer is also arranged so as to calculate an energy balance for at least the selected area to be fused together within each powder layer, it being determined in the calculation whether energy radiated into the selected area from the surroundings of the selected area is sufficient to maintain a defined working temperature of the selected area.

The purpose of calculating the energy balance for the powder layers is to calculate the power required in order to keep the surface of the object at a given temperature. The power is assumed to be constant over the entire surface.

How the energy balance calculation is performed in an embodiment of the invention where the calculation is performed for one layer at a time is described below.

In order for it to be possible to calculate the power in real time, simplifications are necessary:

1. We imagine that the temperature is constant in the x and y directions and that it varies only in the z direction, in other words the entire surface has the same temperature.
2. The temperature in the z direction varies with jLt, where j is the layer number and Lt is the layer thickness.
3. The temperature distribution during fusion is assumed to be stationary.

The following parameters have an effect on the calculation:

Various indexes:
i=index for the top layer
j=layer index goes from 1 to i

Object data:
Lt=layer thickness to be fused [m]
Lcont(j)=contour length for layer j [m]
Apowt(z)=Apow(j)=area facing the powder for layer j [m]
A(z)=A(j) total surface area fused for layer j [m$^2$]

Material properties:
$\lambda_{met}$=thermal conductivity of the material [W/mK]
$\sigma_{met}$=radiation constant for the metal surface [W/m$^2$K]
$\sigma_{metpow}$=radiation constant for metal surface covered with powder [W/m$^2$K]
$\sigma_{pow}$=radiation constant for the powder surface [W/m$^2$K]
$\lambda_{pow}$=thermal conductivity of the powder [W/mK]
$h_{pow}(z)$=heat transfer coefficient from the object out to the powder [W/m$^2$K]
α=proportion of the radiation power taken up by the material Temperatures [K]:
Tsur(i)=temperature of the surroundings affecting the surface when layer i is fused (can be measured on the heating shield)
Tpow(z)=temperature in the powder
T(z)=temperature in the object Tsurf(i)=T(iLt)=desired temperature on the surface of the object when layer i is fused. (Is set in AMA)

Tbott(i)=temperature at the bottom of the object before layer i is started (Is measured just before raking or is calculated. See below.)

In order to determine how the temperature is distributed in the object, we solve the one-dimensional stationary thermal conductivity equation including a source term which takes account of heat losses out into the powder:

$$-\lambda_{met}\frac{\partial^2 T(z)}{\partial z^2} = \frac{h_{pow}(z)Apow(z)}{A(z)Lt}(Tpow(z) - T(z))$$

The boundary conditions on the surface and at the bottom are:

$$-\lambda_{met}\frac{\partial T(z)}{\partial z}\bigg|_{z=iLt} = \frac{(\sigma_{met} + \sigma_{pow})}{2}(T(iLt)^4 - Tsur(i)^4) - \frac{P_{in}}{A(iLt)}$$

$$-\lambda_{met}\frac{\partial T(z)}{\partial z}\bigg|_{z=0} = h_{pow}(Tbott(i) - T(0))$$

Where A and B are two constants.

Rewrite the formulas as differential formulas instead and let j be indexed for each layer.

$$-\lambda_{met}\frac{T(j+2) - 2T(j+1) + T(j)}{Lt^2} = \frac{h_{pow}(j)Apow(j)}{A(j)Lt}(Tpow(j) - T(j))$$

$$-\frac{\lambda_{met}}{Lt}(T(i) - T(i-1)) = \frac{(\sigma_{met} + \sigma_{pow})}{2}(T(i)^4 - Tsur(i)^4) - \frac{P_{in}}{A(i)}$$

$$-\frac{\lambda_{met}}{Lt}(T(2) - T(1)) = h_{pow}(Tbott(i) - T(1))$$

where $$1 \leq j \leq i - 2$$

The boundary condition on the surface actually provides us with nothing new as far as the temperature distribution in the object is concerned as the temperature of the surface is determined by T(i). But it is required in order to determine Pin which is the power necessary in order to keep the temperature on the surface at T(i). T(j) is now obtained from the following equation system:

$$\Delta(j) = -\frac{h_{pow}(j)Apow(j)Lt}{A(j)\lambda_{met}}$$

$$T(j+2) - 2T(j+1) + T(j)(1 + \Delta(j)) = \Delta(j)Tpow(j)$$

$$T(1) = Tbott(i)\frac{h_{pow}(1)Lt/\lambda_{met}}{(1 + h_{pow}(1)Lt/\lambda_{met})} + T(2)\frac{1}{(1 + h_{pow}(1)Lt/\lambda_{met})}$$

Insert the expression pressure for T(1) and formulate the problem as a linear equation system:

1. $T(3) - 2T(2) + T(2)\frac{(1 + \Delta(1))}{(1 + h_{pow}(1)Lt/\lambda_{met})} =$ $$\Delta(1)Tpow(1) - Tbott(i)\frac{h_{pow}(1)Lt/\lambda_{met}}{(1 + h_{pow}(1)Lt/\lambda_{met})}(1 + \Delta(1))$$

-continued

2. $T(4) - 2T(3) + T(2)(1 + \Delta(2)) = \Delta(2)Tpow(2)$ 1-2. $-2T(i-1) + T(i-2)(1 + \Delta(i-2)) =$ $$\Delta(i-2)Tpow(i-2) - T(i)$$

In matrix form this becomes:

$$Ax = b$$

where then:

$$A_{jk} = \delta(j+1-k) - 2\delta(j-k) + \delta(j-1-k)(1 + \Delta(j)) +$$

$$\delta(1-k)\delta(1-j)\frac{(1 + \Delta(1))}{(1 + h_{pow}(1)Lt/\lambda_{met})}$$

$$x_l = T(2), \ldots, x_{l-2} = T(i-1)$$

$$b_j = \Delta(j)Tpow(j) - \delta(j-1)Tbott(i)\frac{h_{pow}(1)Lt/\lambda_{met}}{(1 + h_{pow}(1)Lt/\lambda_{met})}$$

$$(1 + \Delta(1)) - \delta(j - i + 2)T(i)$$

In order for it to be possible to solve the equations, it is necessary that the temperature of the powder, Tpow(j), and the heat transfer coefficient, $h_{pow}$(j), are known. In the program, Tpow(z) is set to:

$$Tpow(j)=AT(j)_{i-1}+BTsur(i-1)$$

i−1 means that the temperature for the previous layer is used in order to determine Tpow(j).

Figure 28:
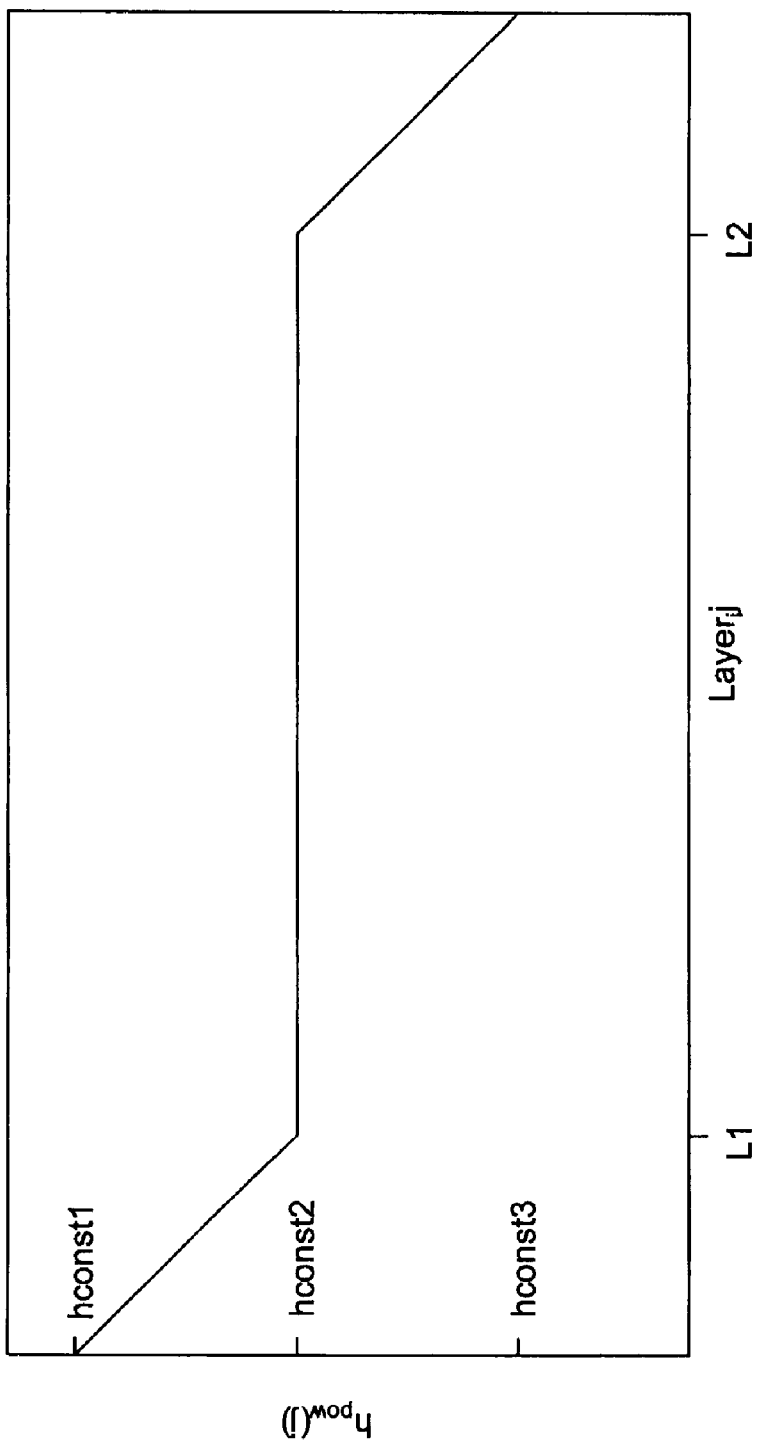
FIG. 28 shows an embodiment of a function used for a heat transfer coefficient.

The function used for $h_{pow}$(j) is depicted in FIG. 28.

The values L1 and L2 have been assumed to be area-independent while hconst1, hconst2 and hconst3 are assumed to depend on A(j). All the constants in the expressions for both Tpow and hpow have been produced by adapting the 1D model above to 3D FEM calculations on objects with simple geometries.

Included in the expression for the source term is Apow(j) which is actually the total area facing the powder for each layer. In the case of large area transitions, this value may be very great, which means that the value of the source term jumps. Such discrete jumps make the solution unstable. In order to prevent this, according to a preferred embodiment, Apow(j) is set to Lcont(j)*Lt. Power losses which arise owing to an area transition are instead added afterwards. The size of the power loss depends on how large over the respective underlying area the area transition is and how far below the top layer it is located. The values for different area transitions and different depths have been produced by 3D FEM simulations. For an arbitrary area transition, the additional power is obtained by interpolation.

Before the power is calculated, the program reads the various values for Lcont(j)*Lt and A(j) for each layer. With the aid of a script file, these can be influenced in various ways. In this way, it is possible to control the power for each layer. How the various geometry parameters are influenced emerges from the description of how the script file functions.

When the equation system above is solved, the total power required in order to keep the surface at Tsuff(i) is obtained from the boundary condition for the surface:

$$P_{in} = A(i) \left( \frac{\lambda_{met}}{Lt}(T(i) - T(i-1)) + \frac{(\sigma_{met} + \sigma_{pow})}{2}(T(i)^4 - Tsur(i)^4) \right)$$

When a layer is fused, use is made of different current and speed over the surface. In order for it to be possible to calculate the different currents required, the mean value of all powers used is set equal to Pin.

If a layer is to be fused using n, different currents, then:

$$P_{in} = \alpha U \frac{\sum_{k=1}^{k=n_1} I_{ik} t_{ik}}{T_{tot}}$$

$$t_{ik} = \frac{l_{ik}}{v_{ik}}$$

$$T_{tot} = \sum_{k=1}^{k=n_1} t_{ik}$$

Where $t_{ik}$ is the fusion time for each current $I_{ik}$
$I_{ik}$ is the fusion length
$v_{ik}$ is the fusion speed
$T_{tot}$ is the total fusion time for the layer i
U is the acceleration voltage.

In order for it to be possible to calculate the currents, the speeds must therefore be known. These are obtained from what are known as speed functions which indicate the relationship between current and speed. As these functions are not analytical, an iterative procedure must be used in order to determine all the currents and speeds. In the calculation program, each starting value of $I_{ik}$ is guessed. The various speeds are then obtained. The values of the currents are then increased until the mean value of the power just exceeds the calculated value of Pin.

Assume now that we want to fuse the various part areas at such a speed and current that the energy which is delivered to the material is less than that required in order to keep the surface at Tsurf(i). The surface must then be heated. The number of times required in order to heat the surface is obtained by adding a heating term in the expression for the mean value of the power:

$$P_i^{heat} = \frac{n\alpha U I_i^{heat} l_i^{heat}}{v_i^{heat}}$$

and adding the heating time in the expression for the time $T_{tot}$:

$$t_i^{heat} = \frac{n l_i^{heat} l_i^{heat}}{v_i^{heat}}$$

where n indicates how many times the surface has to be heated.

The calculation routine shown above can be used for the entire powder layer. In an alternative embodiment, calculation can be carried out for various part areas of the powder layer. The equations indicated above can be used in this case as well. However, different boundary conditions are obtained for the inner edges which lie close to a fused body.

Figure 14:
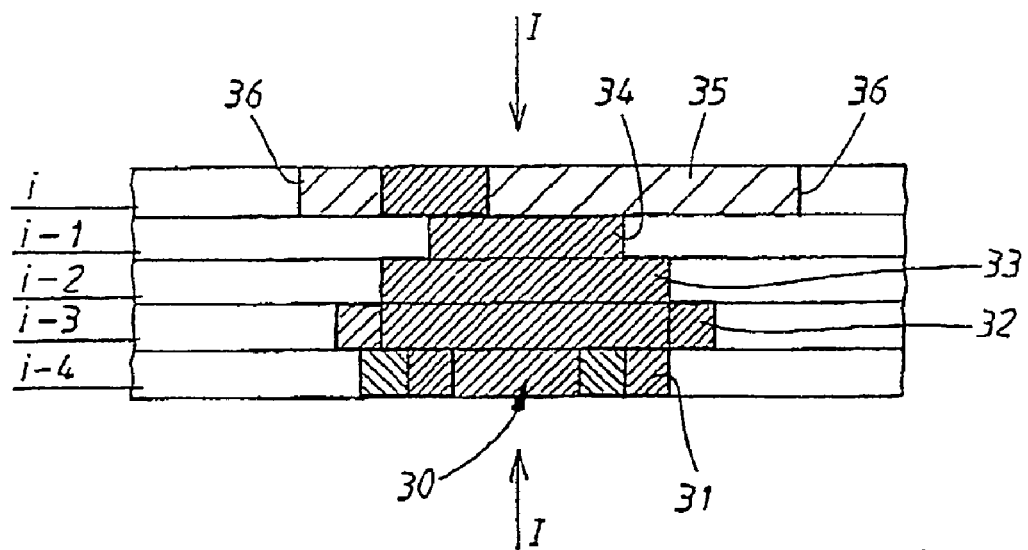
FIG. 14 shows diagrammatically a cross section of a three-dimensional body formed by a number of powder layers and also a top powder layer.

FIG. 14 shows a side view of a fused-together body 30 which is built up by fusing together part areas 31-34 in consecutive powder layers i-1, i-2, i-3, i-4. A real body manufactured according to the invention can of course have many more layers than indicated in this example.

A top powder layer i is distributed on the body. Located within this top powder layer is a selected area 35. The selected area 35 consists of the area which, according to an operating scheme, is to be fused together. The selected area 35 within the layer i is delimited by an outer edge 36. It is of course conceivable for a selected area to comprise both outer and inner edges. The balance calculation is to be performed on the entire selected area 35. The selected area 35 is preferably divided into a plurality of smaller part areas as shown in FIG. 15, it then being possible for separate calculations to be performed for the part areas.

Figure 15:
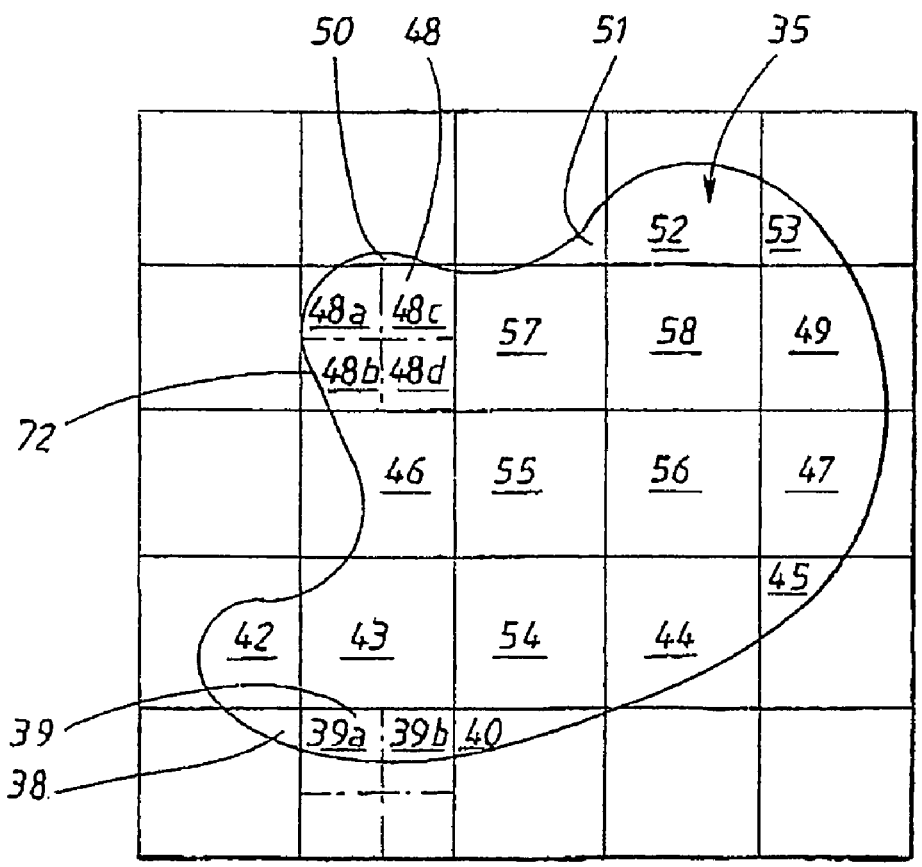
FIG. 15 shows a selected area which is divided into a set of separate areas.

FIG. 15 shows a selected area 35 which is divided into a plurality of smaller part areas 38-53, an energy balance being calculated for each of said set of separate part areas 38-53. The selected area is delimited by an outer edge 72. The selected area can of course also comprise inner edges.

According to another preferred embodiment of the invention, said set of separate areas 38-53 comprises a first group of areas 54-58 of which the edges lie entirely within the selected area 35 and a second group of areas 38-53 of which the edges coincide at least in part with the edge 72 of the selected area. Where appropriate, the areas within said second group of areas can be divided into sub-areas 38a, 39b; 48a-48d. Each of the part areas 54-58 making up said first group of areas preferably has the same shape. In the example shown, the areas are square. Rectangular, triangular and hexagonal areas can advantageously be used. Boundary conditions within this group are also similar apart from possible temperature differences. The use of likeness of shape allows the calculation routines to be simplified as in part common calculations can be performed.

The energy balance is calculated in principle according to $E^{in}(i)=E^{out}(i)+E^{heat}(i)$, where $E^{in}(i)$ represents energy fed into the part area, $E^{out}(i)$ represents energy losses through dissipation and radiation from the part area, and $E^{heat}(i)$ represents stored in the part area. The energy fed in consists of on the one hand energy $E^{in}(c)$ which has been radiated in or has flowed in via thermal conduction from the surroundings of the part area 35 for which the energy balance is calculated and on the other hand of energy $E^{in}(s)$ which has been radiated in from the radiation gun 6. If the energy balance is calculated befsore energy has been supplied to the part area 35, $E^{in}(s)$ therefore=0. According to a preferred embodiment of the invention, at least a first energy balance calculation is performed for the part area 35 before energy has been supplied via the radiation gun 6.

Figure 16:
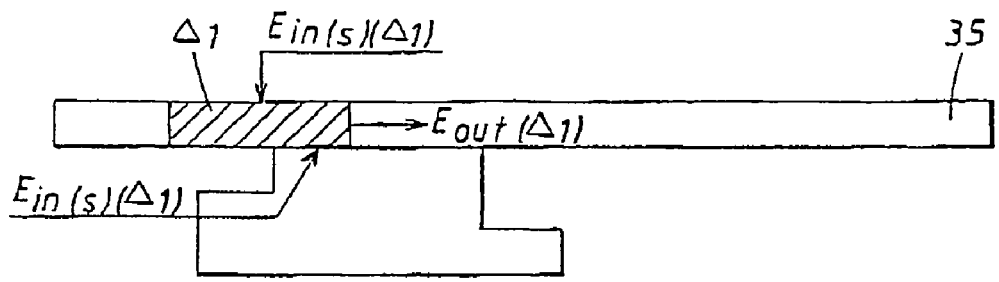
FIG. 16 shows a schematic model for calculating energy balance.

FIG. 16 shows diagrammatically a model on which the calculation of the energy balance for the part area $\Delta_1$ is based. In this case, the part area $\Delta_1$ corresponds to a part of the selected area of the powder layer i. In this case, the equation for calculation of the energy balance has the appearance $E^{in}(\Delta_1)=E^{out}(\Delta_1)+E^{heat}(\Delta_1)$, where $E^{in}(\Delta_1)$ represents energy fed into the part area, $E^{out}(\Delta_1)$ represents energy losses through dissipation and radiation from the part area $\Delta_1$ and $E^{heat}(\Delta_1)$ represents stored in the part area $\Delta_1$. The energy fed in consists of on the one hand energy $E^{in(c)}(\Delta_1)$ which has been radiated in or has flowed in via thermal conduction from the surroundings of the part area $\Delta_1$ and on the other hand of energy $E^{in(s)}\Delta_1$ which has been radiated in from the radiation gun 6.

Figure 17:
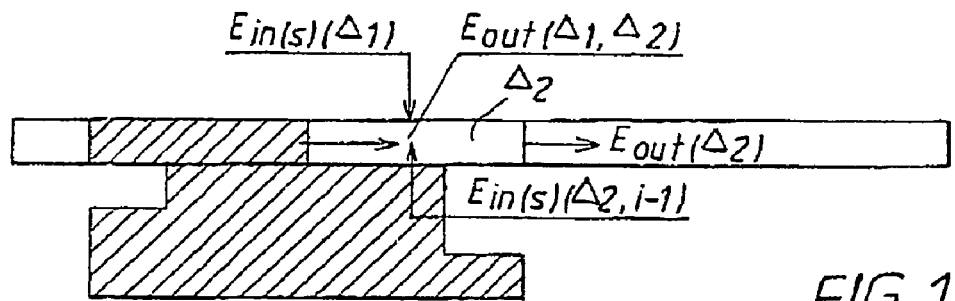
FIG. 17 shows another schematic model for calculating energy balance.

FIG. 17 shows diagrammatically a model on which the calculation of the energy balance for a second part area $\Delta_2$ within the selected area 35 in the layer i is based. In this case, the part area $\Delta_2$ corresponds to a part of the selected area 35 of the powder layer i which has not yet been fused together and which is adjacent to a first part area $\Delta_1$ within the powder layer i, where radiation or thermal conduction takes place from said first to said second part area. In this case, the equation for calculation of the energy balance has the appearance $E^{in}(\Delta_2)=E^{out}(\Delta_2)+E^{heat}(\Delta_2)$, where $E^{in}(\Delta_2)$ represents energy fed into the part area, $E^{out}(\Delta_2)$ represents energy losses through dissipation and radiation from the part area $\Delta_1$ and $E^{heat}(\Delta_2)$ represents stored in the part area $\Delta_2$. The energy fed in consists of on the one hand energy $E^{in(c)}(\Delta_2)$ which has been radiated in or has flowed in via thermal conduction from the surroundings of the part area $\Delta_1$ and on the other hand of energy $E^{in(s)}\Delta_2$ which has been radiated in from the radiation gun 6. The energy $E^{in(c)}(\Delta_2)$ supplied via thermal conduction comprises the component $E^{in(s)}(\Delta_2, i-1)$ which corresponds to energy supplied from the previous layer and also $E^{out}(\Delta_1, \Delta_2)$ which corresponds to energy which has been dissipated or radiated from the first part area $\Delta_1$ and supplied to the second part area $\Delta_2$.

Figure 18:
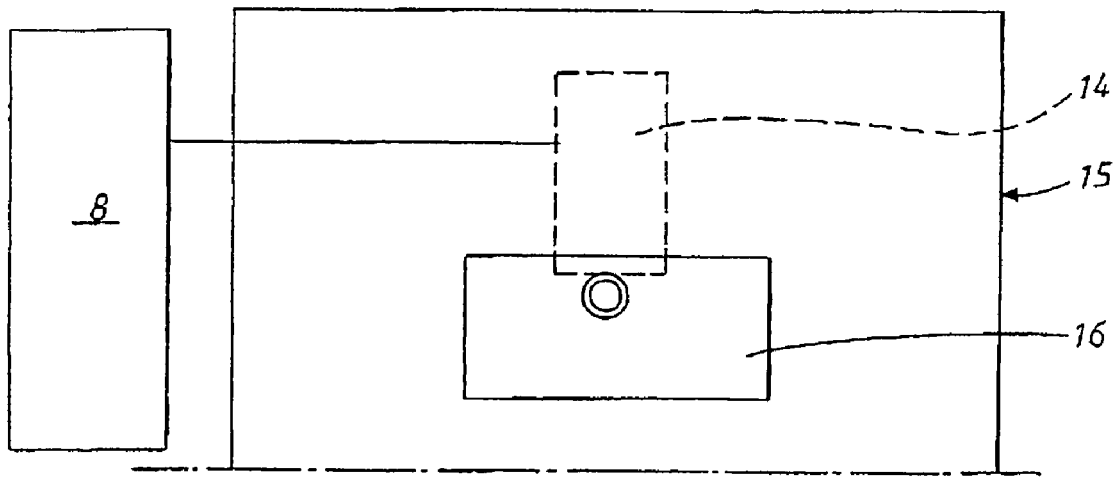
FIG. 18 shows a view from the side of a chamber provided with a transparent window.

According to FIG. 18, the arrangement also comprises, according to a preferred embodiment of the invention, means 14 for sensing surface properties of a surface layer located in the powder bed. This means 14 for sensing the temperature distribution of a surface layer located in a powder bed 5 preferably consists of a camera. In a preferred embodiment of the invention, the camera is used on the one hand to measure the temperature distribution on the surface layer and on the other hand to measure the occurrence of surface irregularities by means of the shadow formation to which surface irregularities give rise. On the one hand, information about the temperature distribution is used to bring about as uniform a temperature distribution as possible over those parts of the surface layer which are to be fused and, on the other hand, information can be used in order to check for any dimensional deviations between generated three-dimensional product and original design as the temperature distribution reflects the shape of the product. In a preferred embodiment of the invention, the video camera is mounted on the outside of the casing 15 which encloses the powder bed 5 and the radiation gun 6. In order to make temperature measurement possible, the casing is provided with a transparent window 16. The powder bed 5 is visible for the camera through this window.

Figure 19:
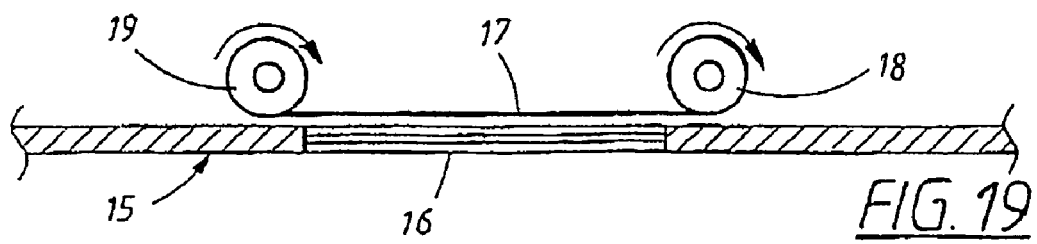
FIG. 19 shows an arrangement for feeding and fixing a protective film for maintaining the transparency of the window.

In a preferred embodiment of the invention, which is shown in FIG. 19, the window 16 is covered by a protective film 17. The protective film is fed from a feed-out unit 18 to a collecting unit 19, the film being gradually replaced, which means that the transparency can be maintained. The protective film is necessary as coatings form as a consequence of the fusion process.

A detailed description relating to generating and correcting operating schemes follows below in connection with the description of drawing FIG. 20-.

Figure 20:
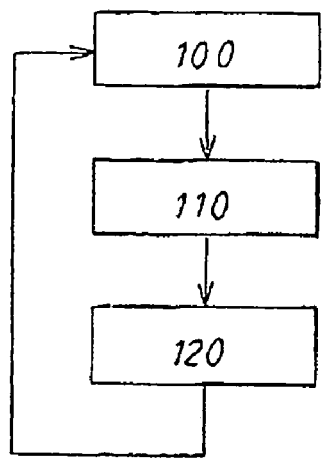
FIG. 20 shows diagrammatically a method for production of three-dimensional bodies.

FIG. 20 shows diagrammatically a method of producing three-dimensional bodies according to the invention. The three-dimensional body is formed by successive fusing together of selected areas of a powder bed, which parts correspond to successive cross sections of the three-dimensional body.

In a first method step 100, application of a powder layer to a work table takes place. Application is effected by the means 28 mentioned above distributing a thin layer of powder on the work table 2.

In a second method step 110, energy is supplied from a radiation gun 6, according to an operating scheme determined for the powder layer, to a selected area within the powder layer, fusing together of the area of the powder layer selected according to said operating scheme then taking place to form a cross section of said three-dimensional body. A three-dimensional body is formed by successive fusing together of successively formed cross sections from successively applied powder layers. The successive cross sections are divided into one or more inner areas I, each having an edge R.

According to a first embodiment of the invention, the operating scheme is designed in such a way that the radiation gun fuses together the inner area I of a set of adjacent part areas in a first process step, after which said edges R are fused together and connect said part areas in a second, subsequent process step.

According to an alternative embodiment of the invention, the edges are fused together in a first process step for a number of consecutive powder layers, after which the inner areas of said consecutive powder layers are fused together in a common second process step for said consecutive powder layers.

According to a second embodiment of the invention, the operating scheme is arranged so as to determine the priority for treating said plurality of smaller part areas with the aid of a random number generator.

In a preferred embodiment of the invention, the inner area is fused together in the course of a movement pattern for the focal point of the beam of the radiation gun which comprises a main movement direction and an interference term which is added to said main movement direction and has a component in a direction at right angles to the main movement direction. According to a preferred embodiment, the edge is fused together in the course of a mainly rectilinear movement of the beam of the radiation gun.

In a preferred embodiment, an energy balance is calculated in a third method step 120 for at least the selected area to be fused together within each powder layer, it being determined in the calculation whether energy radiated into the selected area from the surroundings of the selected area is sufficient to maintain a defined working temperature of the selected area. Calculation is performed according to the models indicated above.

Figure 21:
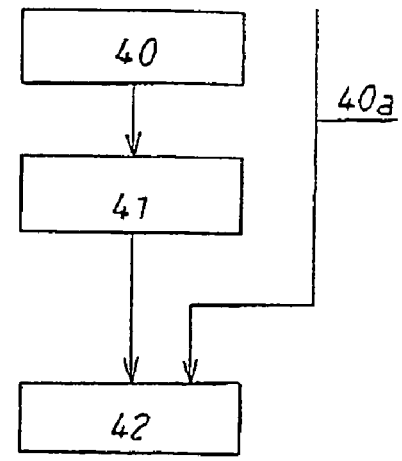
FIG. 21 shows a flow diagram for generating primary operating schemes.
Figure 25:
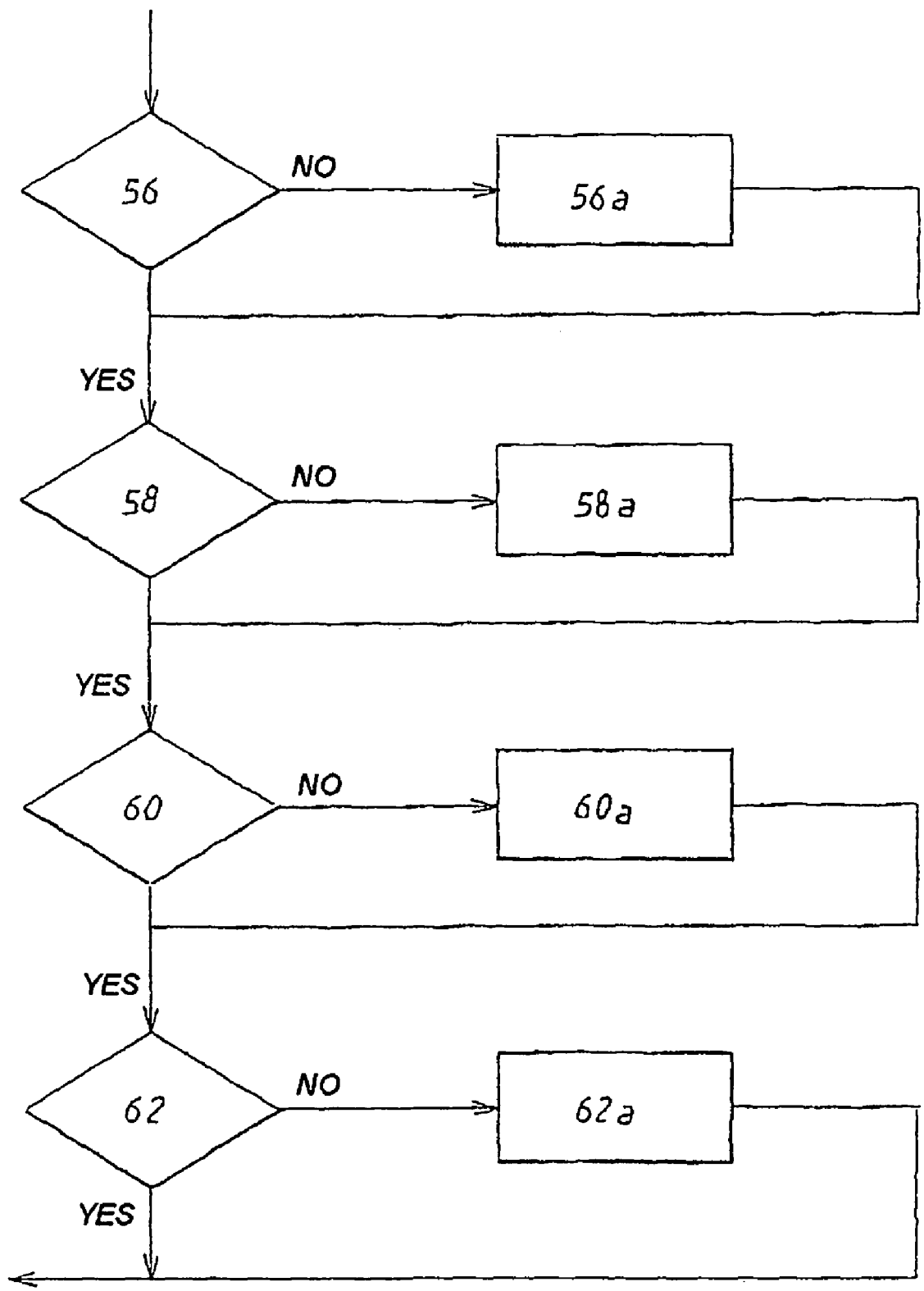
FIG. 25 shows diagrammatically a procedure for correction of operating schemes.
Figure 26:
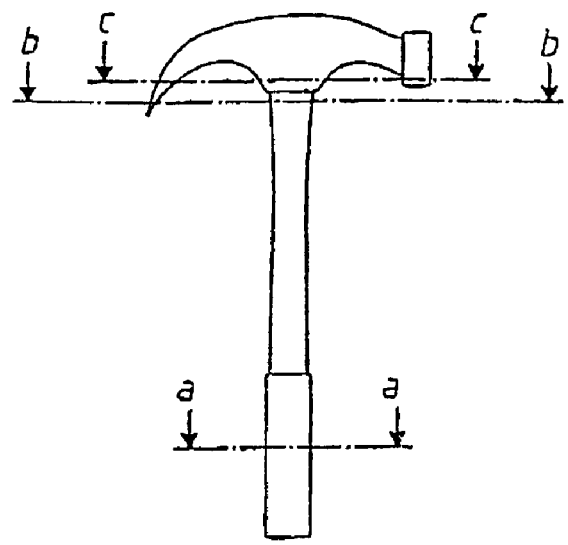
FIG. 26 shows a diagrammatic construction of a three-dimensional article.
Figure 27:
FIG. 27 shows a number of cross sections from FIG. 26.
Figure 27:
Figure 27:

FIG. 21 shows diagrammatically the procedure for generating primary operating schemes. In a first step 40, a 3D model is generated, in a CAD program for example, of the product to be manufactured, or alternatively a ready-generated 3D model of the product to be manufactured is input into the control computer 8. Then, in a second step 41, a matrix containing information about the appearance of cross sections of the product is generated. FIG. 25 shows a model of a hammer with examples of associated cross sections 31-33. These cross sections are also shown in FIG. 26a-26c. The cross sections are distributed with a density corresponding to the thickness of the various layers to be fused together in order to form the finished product. The thickness can advantageously be varied between the various layers. It is inter alia advantageous to make the layers thinner in areas where there is great variation in the appearance of the cross sections between adjacent layers. When the cross sections are generated, a matrix containing information about the appearance of all the cross sections which together make up the three-dimensional product is therefore created.

Once the cross sections have been generated, a primary operating scheme is generated for each cross section in a third step 42. Generation of primary operating schemes is based on shape recognition of the parts which make up a cross section on the one hand and knowledge of how the operating scheme affects the cooling temperature of local parts of a cross section on the other hand. The aim is to create an operating scheme which allows the cooling temperature to be as uniform as possible in the parts which are fused together before the next layer is applied at the same time as the cooling temperature is to be kept within a desired range in order to reduce the risk of shrinkage stresses appearing in the product and to reduce the magnitude of shrinkage stresses which have arisen in the product, with deformation of the product as a consequence.

In the first place, a primary operating scheme is generated on the basis of the shape of separate component parts of the cross section. When generation takes place, the edge and the inner area of each cross section are identified. Where appropriate, a set of inner areas which each have edges is formed. According to the invention, an operating scheme is generated for the inner areas which has a movement pattern for the focal point of the radiation gun which comprises a main movement direction and an interference term which is added to said main movement direction and has a component in a direction at right angles to the main movement direction as indicated above. At the edges, the focal point of the radiation gun moves in a mainly linear movement pattern. This means that the radiation gun follows the shape of the edge.

In a preferred embodiment of the invention, primary operating schemes are therefore laid out on the basis of experience of which operating schemes provide a good temperature distribution of the cooling temperature of the cross section, it then being possible for the risk of shrinkage stresses in the product with deformation of the product as a consequence to be reduced. To this end, a set of operating schemes for areas of different shapes is stored in a memory. The operating schemes according to the invention are designed in such a way that the focal point of the radiation gun, within inner areas I, moves in a movement pattern which comprises a main movement direction and an interference term which is added to said main movement direction and has a component in a direction at right angles to the main movement direction. In addition to this information, the operating schemes can comprise a list of the order in which a set of inner areas is to be treated, information about heating different areas and information about energy supply and sweep speed. In a preferred embodiment, this memory is updated as results of corrections of the operating scheme are evaluated, a self-learning system being obtained.

In an alternative embodiment of the invention, ready-finished cross sections, which have been generated by a stand-alone computer, are input into a memory in the control computer, where said primary operating schemes are generated. In this case, information is provided directly to the third step 42 via an external source 40a.

Figure 22:
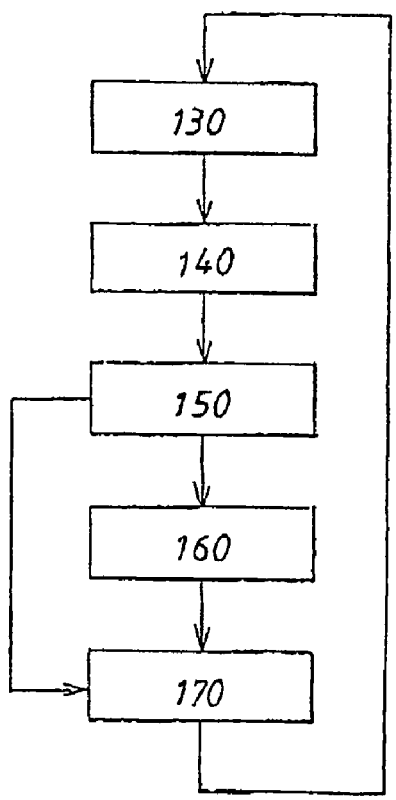
FIG. 22 shows a flow diagram for an operating scheme of the arrangement.

FIG. 22 shows diagrammatically a procedure for generating a three-dimensional body, which comprises method steps for calculating an energy balance for a layer. In a first method step 130, parameters on which an energy balance calculation is based are determined. In a second method step 140, calculation of the energy balance for at least the selected area 35 takes place. Calculation is performed according to the method illustrated previously.

In a third method step 150, the operating scheme is updated depending on the calculated energy balance. If the result of the energy balance is that sufficient heat energy is stored in the selected area to maintain a desired working temperature, no extra energy supply takes place. According to one embodiment of the invention, if the result of the energy balance is that sufficient heat energy to maintain a desired working temperature is not stored in the selected area, an extra energy supply takes place in the form of preheating of the selected area before fusing together takes place. This preheating can be effected by the radiation gun being swept very rapidly over the area or the radiation gun sweeping over the area with lower power than normal, or alternatively a combination of both of these. The preheating takes place in a fourth method step 160.

In a fifth method step 170, fusing together is effected by the radiation gun sweeping over the selected area.

Figure 23:
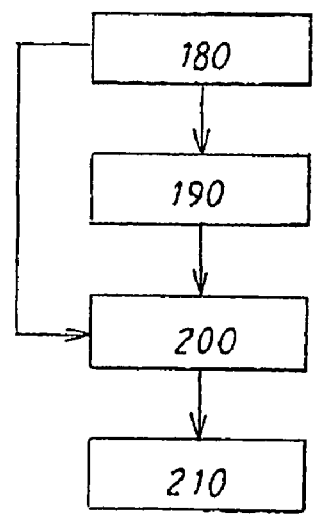
FIG. 23 shows a flow diagram for correction of said operating scheme.

FIG. 23 shows diagrammatically an embodiment of the invention which, where appropriate, utilizes the methods described above for generating and correcting the operating schemes. In a first method step 180, one or more of the inner areas I of the selected area are identified. In a second method step 190, the edge or edges R which are associated with said inner areas and each surround said inner areas are identified. In a third method step 200, said inner areas I are fused together in the course of a partly overlapping circular movement of the beam emitted by the radiation gun. During a fourth method step 210, said edges are fused together in the course of a rectilinear movement of the beam. The magnitude of the correction is smaller for processes which use the method according to the invention with a movement pattern having an interference term and also for processes where an energy balance calculation is performed. A correction can nevertheless be used in order further to improve the end result.

According to one embodiment of the invention, the operating scheme is arranged so as consecutively to fuse together the powder within one area at a time within said inner areas.

According to a preferred embodiment of the invention, the control computer is arranged so as to divide the surface within each powder layer into a set of separate areas. The control computer is also arranged so as to ensure that said inner areas of a set of areas within said first group of areas are fused together in the course of a partly overlapping circular movement of the beam of the radiation gun.

In one embodiment of the invention, the fusing together of the inner areas in said second group of areas takes place with a focal point movement comprising an interference term as described above. In an alternative embodiment of the invention, the fusing together within the inner areas in said second group of areas takes place with a mainly rectilinear movement.

According to a preferred embodiment of the invention, in the case of the embodiments described above relating to division of the selected surface into smaller part surfaces, the calculation of energy balance described above is used in order to control the operating scheme with regard to calibration of the power of the beam and supply of energy for heating the powder bed before final fusing together takes place.

FIG. 23 shows diagrammatically a procedure comprising correction of operating schemes with the aid of information obtained from a camera which measures the temperature distribution over the surface of the powder bed. According to the procedure, the beam from the radiation gun is guided over the powder bed in order to generate a cross section of a product. In a first step 50, guidance of the beam over the powder bed according to the primary operating scheme defined in step 42 is started. In the next step 51, the temperature distribution on the surface layer of the powder bed is measured by the camera. From the measured temperature distribution, a temperature distribution matrix, $T_{ij\text{-}measured}$, is then generated, in which the temperature of small part areas of the surface layer of the powder bed is stored. When the matrix is generated, each temperature value $T_{ij\text{-}measured}$ in the matrix is compared with a desired value in a desired value matrix $T_{ij\text{-}desired\ value}$. The surface layer of the powder bed can be roughly divided into three categories. Firstly, areas where fusing together takes place by treatment by the radiation gun. In these areas, the maximum fusion temperature $T_{ij\text{-}max}$ is of interest. Secondly, areas which have already been fused together and are thus cooling. In these areas, a minimum permitted cooling temperature $T_{ij\text{-}cooling\text{-}min}$ is of interest because too cold a cooling temperature gives rise to stresses and thus deformations of the surface layer. Thirdly, areas which have not been treated by the radiation gun. In these areas, the bed temperature $T_{ij\text{-}bed}$ is of interest. It is also possible for the temperature to be compared only in treated areas, $T_{ij\text{-}bed}$ not then being stored and/or checked.

In a third step 52, it is investigated whether $T_{ij\text{-}measured}$ deviates from the desired value $T_{ij\text{-}desired\ value}$ and whether the deviation is greater than permitted limit values. Limit values $\Delta T_{ij\text{-}max}$, $\Delta T_{ij\text{-}cooling}$ and $\Delta T_{ij\text{-}bed}$ associated with the three different categories are stored in the control computer 8. It is also possible for the bed temperature not to be checked. In this case, the associated limit value is not stored. If the deviation between $T_{ij\text{-}measured}$ and $T_{ij\text{-}desired\ value}$ does not exceed this limit value, it is investigated in a fourth step 53 whether the surface layer is fully treated. If this is not the case, operation according to the current operating scheme continues, method steps 50-53 mentioned above being run through once again.

Figure 24:
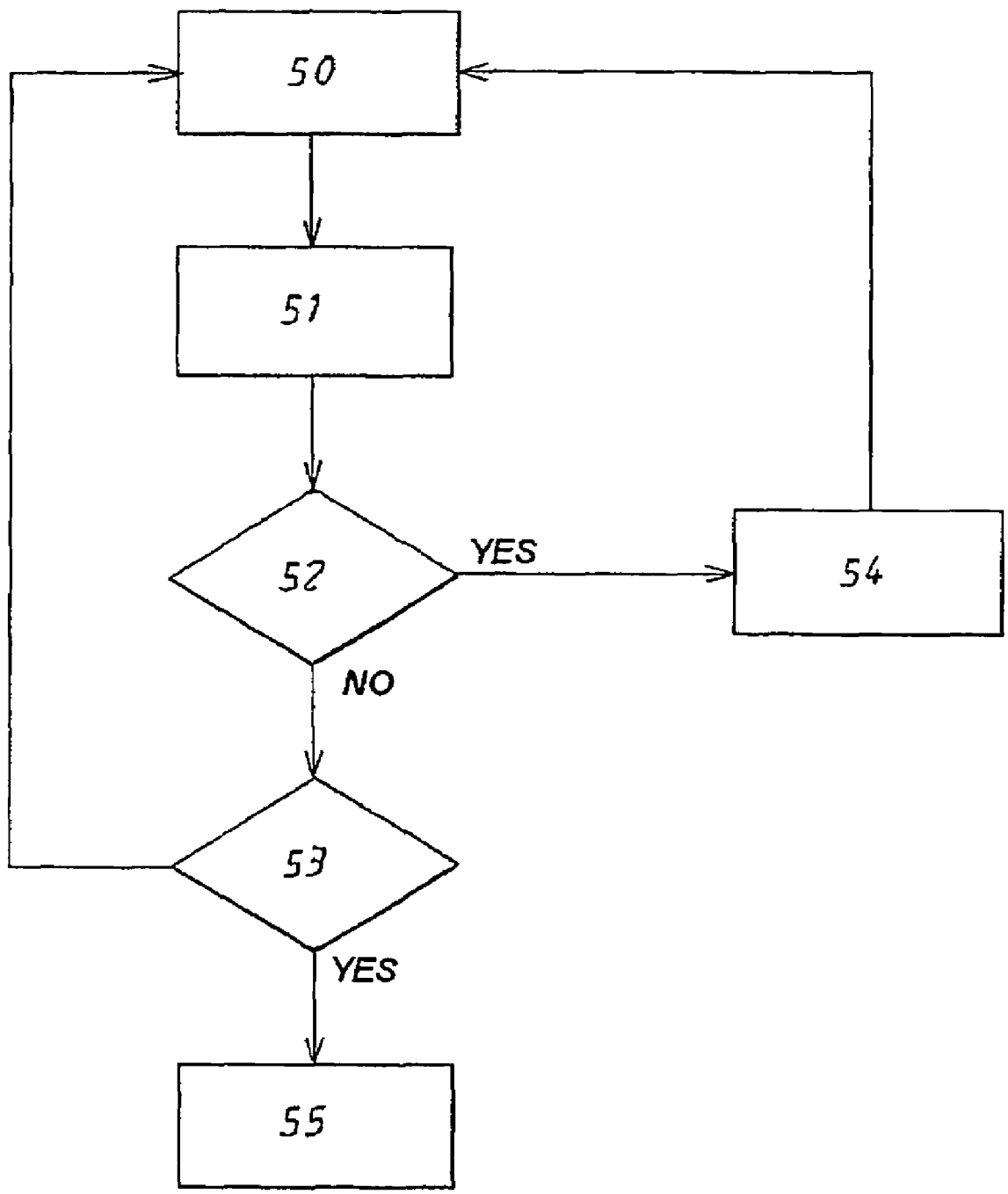
FIG. 24 shows diagrammatically a procedure comprising correction of operating schemes with the aid of information obtained from a camera which measures the temperature distribution over the surface of the powder bed.

If the deviation between $T_{ij\text{-}measured}$ and $T_{ij\text{-}desired\ value}$ exceeds one of said limit values, correction of the operating scheme 42 takes place in a fifth step. In a preferred embodiment, said correction is carried out according to the system shown in FIG. 24.

In a preferred embodiment of the invention, a new powder layer is distributed only after completion of each layer, the product being built up by successive fusing together of powder layers until the product is finished. In this case, after a sixth step 55, a new layer is started, if the product as a whole is not finished, when it has been established in the fourth step 53 that the operating scheme for a layer has been completed.

In a preferred embodiment, the correction of the operating scheme comprises the following method steps:

in a first step 56, $T_{ij\text{-}max}$ is compared with $T_{ij\text{-}max\text{-}desired\ value}$. If $T_{ij\text{-}max}$ deviates from $T_{ij\text{-}max\text{-}desired\ value}$ exceeding $\Delta T_{ij\text{-}max}$, the energy supply to the powder layer is calibrated in a step 56a by either changing the power of the beam or changing the sweep speed of the beam.

In a second step 58, $T_{ij\text{-}cooling}$ is compared with $T_{ij\text{-}cooling\text{-}desired\ value}$. If $T_{ij\text{-}cooling}$ deviates from $T_{ij\text{-}cooling\text{-}desired\ value}$ exceeding $\Delta T_{ij\text{-}cooling}$, the operating scheme of the beam is changed in a step 58a. There are many ways of changing the operating scheme of a beam. One way of changing the operating scheme is to allow the beam to reheat areas before they have cooled too much. The radiation gun can then sweep over areas already fused together with a lower energy intensity and/or at a higher sweep speed.

In a third step 60, it is investigated whether $T_{ij\text{-}bed}$ deviates from $T_{ij\text{-}bed\text{-}desired\ value}$. If the deviation is greater than $\Delta T_{ij\text{-}bed}$, the temperature of the bed can, in one embodiment of the invention, be corrected in a step 60a, for example by the beam being made to sweep over the bed to supply energy. It is also possible to connect separate bed-heating equipment to the arrangement.

It is also possible for a size check of the article being manufactured to be carried out by the heat camera installed in the arrangement. As described above, the bed and the parts which have been fused together are measured. The measured heat distribution reflects fully the shape of the object in a section of the three-dimensional body to be created. A check of the dimensions of the article can in this way be carried out in a fourth step 62, and feedback of X-Y deflection of the beam of the radiation gun is thus possible. In a preferred embodiment of the invention, this check of the deviation between dimensions of the cross section is carried out in a step 62a and, if the deviation is greater than permitted, the X-Y deflection of the radiation gun is corrected.

Moreover, input signals from the camera can be used for identifying the occurrence of surface irregularities, for example in the form of a welding spark. When the coordinates of a surface irregularity have been identified, the operating scheme can be updated so that the radiation gun is ordered to the identified coordinate in order to melt down the surface irregularity.

The invention is not limited to the illustrative embodiment described above; the radiation gun can consist of, for example, a laser, in which case the deflection means consist of guidable mirrors and/or lenses.

The invention can furthermore be used in an arrangement for producing a three-dimensional product by energy transfer from an energy source to a product raw material, which arrangement comprises a work table on which said three-dimensional product is to be built up, a dispenser which is arranged so as to distribute a thin layer of product raw material on the work table for forming a product bed, a means for delivering energy to selected areas of the surface of the product bed, a phase transition of the product raw material being allowed for forming a solid cross section within said area, and a control computer which manages a memory in which information about successive cross sections of the three-dimensional product is stored, which cross sections build up the three-dimensional product, where the control computer is intended to control said means for delivering energy so that energy is supplied to said selected areas, said three-dimensional product being formed by successive joining together of successively formed cross sections from product raw material applied successively by the dispenser.

In this case, the embodiment is not limited to fusing together powder by a radiation gun irradiating the surface of a powder bed. The product raw material can consist of any material which forms a solid body after a phase transition, for example solidification after fusion or hardening. The energy-delivering means can consist of an electron gun or a laser guided over the working surface or alternatively of an energy-delivering means which can project a cross section directly onto the product bed.

The embodiments described above can moreover be provided with all the features described in relation to the embodiment described previously.

The invention claimed is:

1. A method for production of three-dimensional bodies by successive fusing together of selected areas of a powder bed, which parts correspond to successive cross sections of the three-dimensional body, the method comprising:

applying powder layers to a work table, determining an operating scheme for the powder layer, supplying energy from a radiation gun, according to the operating scheme, to said selected area within the powder layer, and fusing together that area of the powder layer selected according to said operating scheme for forming a cross section of said three-dimensional body, a three-dimensional body being formed by successive fusing together of successively formed cross sections from successively applied powder layers, where fusing includes dividing said selected area into a plurality of smaller part areas which each comprise an inner area I and an edge R and said determining an operating scheme includes determining priority for treating said plurality of smaller part areas such that heating of the selected area takes place in a relatively homogeneous way.

2. The method as claimed in claim 1, where fusing further includes
fusing the inner areas I of a set of adjacent part areas in a first process step, and
connecting the adjacent part areas by fusing the edges R belonging to said adjacent part areas in a second process step, said second process step being performed after said first process step.

3. The method as claimed in claim 1 where said priority for treating is determined with the aid of a random number generator.

4. The method as claimed in claim 1, where fusing further includes
fusing said edges together in a first process step for a number of consecutive powder layers, and
fusing inner areas of said consecutive powder layers after fusing said edges in a common second process step for said consecutive powder layers.

5. The method as claimed in claim 2 or 4, where fusing the inner areas includes fusing said inner areas together in the course of a movement pattern for the focal point of the beam of the radiation gun, said movement pattern comprising a main movement direction and an interference term which is added to said main movement direction and has a component in a direction at right angles to the main movement direction.

6. The method as claimed in claims 2 or 4, where fusing said edges includes fusing said edges together in the course of a mainly rectilinear movement of the beam of the radiation gun.

7. The method according to claim 1, the method further including calculating an energy balance for at least one part area within each powder layer, said calculating including determining whether energy radiated into the part area from surroundings of the part area is sufficient to maintain a defined working temperature of the part area.

8. The method as claimed in claim 7, where said supplying energy includes supplying, in addition to said energy for fusing together the part area, energy for that heats the part area to a defined working temperature if the result of the energy balance calculation is that sufficient energy for maintaining an intended working temperature of the part area is not present.

9. The method as claimed in claim 7 where calculating an energy balance includes calculating an energy balance for each powder layer according to $Ein(i) = Eout(i) + Eheat(i)$, where $Ein(i)$ represents energy fed into the part area, $Eout(i)$ represents energy losses through dissipation and radiation from the part area, and $Eheat(i)$ represents energy stored in the part area.

10. The method as claimed in claim 7, where calculating an energy balance includes calculating an energy balance for each of said part areas.

11. An arrangement for producing a three-dimensional product by successive fusing together of successively formed cross sections of said product, the arrangement comprising:
a work table on which said three-dimensional product is built up,
a powder dispenser that forms a powder bed by distributing a thin layer of powder on the work table,
a radiation gun delivers energy to the powder, thereby fusing the powder together,
beam guide that guides the beam emitted by the radiation gun over said powder bed such that radiation from said gun forms one of the cross sections of said three-dimensional product by fusing together parts of said powder bed, and
a control computer that stores information about the successive cross sections of the three-dimensional product, which cross sections build up the three-dimensional product,
where the control computer divides at least a selected area of each cross-section into a plurality of smaller part areas which each comprise an inner area I and an edge R, and controls the radiation gun and beam guide according to an operating scheme for forming each cross section of said three-dimensional product by determining a priority for delivering energy to said plurality of smaller part areas such that heating of the selected area takes place in a relatively homogeneous way.

12. The arrangement as claimed in claim 11, wherein the control computer controls the radiation gun and beam guide such that the radiation gun fuses together the inner area I of a set of adjacent part areas in a first process step, and connects said part areas by fusing together said edges R in a second, subsequent process step.

13. The arrangement as claimed in claim 11 where the control computer further includes a random number generator configured such that the computer determines the priority for treating based on outputs from said random number generator.

14. The arrangement as claimed in claim 11, where the control computer controls the radiation gun and beam guide such that the radiation gun fuses said edges together in a first process step for a number of consecutive powder layers, and then fuses the inner areas of said consecutive powder layers together in a common second process step for said consecutive powder layers.

15. The arrangement as claimed in claims 12 or 14, where the control computer controls the radiation gun and beam guide according to the operating scheme such that the beam guide guides the focal point of the beam of the radiation gun within said inner areas using a movement pattern which comprises a main movement direction and an interference term which is added to said main movement direction and has a component in a direction at right angles to the main movement direction.

16. The arrangement as claimed in claims 12 or 14, where the control computer controls the radiation gun and beam guide according to the operating scheme such that the radiation gun fuses together said edges in the course of a mainly rectilinear movement of the beam of the radiation gun.

17. The arrangement as claimed in claim 11, where the control computer calculates an energy balance for at least one part area within each powder layer, and determines, based on the calculations, whether energy radiated into the part area from the surroundings of the part area is sufficient to maintain a defined working temperature of the part area.

18. The arrangement as claimed in claim 17, where the control computer controls the delivery of energy to the powder according to the operating scheme such that, in addition to energy for fusing together powder layers, the radiation gun delivers energy for heating the powder layer if the result of the energy balance calculation is that the operating scheme is not providing sufficient energy for maintaining an intended working temperature of the part area, a defined working temperature of the part area then being maintained.

19. The arrangement as claimed in claim 17, where the control computer calculates the energy balance for each powder layer according to $Ein(i)=Eout(i)+Eheat(i)$ where $Ein(i)$ represents energy fed into the part area, $Eout(i)$ represents energy losses through dissipation and radiation from the part area, and $Eheat(i)$ represents energy stored in the part area.

20. The arrangement as claimed in claim 17, where the control computer calculates an energy balance for each of said part areas.

21. The arrangement as claimed in claim 11, the arrangement further comprising a temperature sensor that senses the temperature distribution of a surface layer located in the powder bed.

22. The arrangement of claim 11, where the radiation gun includes at least one high-energy laser.

23. The arrangement of claim 11, where the radiation gun is an electron gun.

* * * * *